US008812221B2

(12) United States Patent
Hozumi et al.

(10) Patent No.: US 8,812,221 B2
(45) **Date of Patent: *Aug. 19, 2014**

(54) STOP CONTROL SYSTEM AND METHOD FOR INTERNAL COMBUSTION ENGINE

(75) Inventors: Tomoharu Hozumi, Saitama-ken (JP); Atsushi Mitsui, Saitama-ken (JP); Takeshi Aoki, Saitama-ken (JP); Hiroshi Yatani, Saitama-ken (JP); Kazuhiko Imamura, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 13/384,744

(22) PCT Filed: Jul. 30, 2010

(86) PCT No.: PCT/JP2010/062901

§ 371 (c)(1),
(2), (4) Date: Jan. 18, 2012

(87) PCT Pub. No.: WO2011/013800

PCT Pub. Date: Feb. 3, 2011

(65) Prior Publication Data

US 2012/0130619 A1 May 24, 2012

(30) Foreign Application Priority Data

Jul. 30, 2009 (JP) ................................ 2009-177943

(51) Int. Cl.
*B60T 7/12* (2006.01)

(52) U.S. Cl.
USPC .......................................... 701/112; 123/481

(58) Field of Classification Search
USPC .......... 701/101–115; 123/350–352, 395, 399, 123/403, 481
See application file for complete search history.

(56) References Cited

U.S. PATENT DOCUMENTS

| | | | | |
|---|---|---|---|---|
| 4,987,871 | A * | 1/1991 | Nishikawa | 123/362 |
| 7,133,762 | B2 * | 11/2006 | Sekita et al. | 701/107 |
| 2012/0116653 | A1 * | 5/2012 | Hozumi et al. | 701/103 |

FOREIGN PATENT DOCUMENTS

| | | | |
|---|---|---|---|
| EP | 1 367 246 | A1 | 12/2003 |
| EP | 1 582 738 | A2 | 10/2005 |
| JP | 11-159352 | | 6/1999 |
| JP | 3356033 | B2 | 10/2002 |
| JP | 2005-282426 | A | 10/2005 |
| JP | 2006-242082 | A | 9/2006 |
| JP | 2008-180096 | A | 8/2008 |
| WO | WO 2006/134470 | A1 | 12/2006 |
| WO | WO 2008/072063 | | 6/2008 |

* cited by examiner

*Primary Examiner* — John Kwon
(74) *Attorney, Agent, or Firm* — Arent Fox LLP

(57) ABSTRACT

A stop control system for an internal combustion engine, which is capable of accurately stopping a piston at a predetermined position during stoppage of the engine while preventing occurrence of untoward noise and vibration. After stopping the engine 3, the stop control system 1 for the engine 3 according to the present invention executes a first stage control (step 34) in which a throttle valve 13*a* is controlled to a first stage control target opening degree ICMDOFPRE smaller than a second predetermined opening degree ICMDOF2, in order to stop the piston at the predetermined position, before executing a second stage control (step 42) in which the throttle valve 13*a* is controlled to the second predetermined opening degree ICMDOF2. Further, the stop control system 1 stabilizes initial conditions at the start of the second stage control by setting a first stage control start rotational speed NEICOFPRE and a first stage control target opening degree ICMDOFPRE according to a change in a corrected target stop control start rotational speed NEICOFREFN (steps 71 and 85).

8 Claims, 25 Drawing Sheets

STOP CONTROL SYSTEM AND METHOD FOR INTERNAL COMBUSTION ENGINE

CROSS-REFERENCE TO RELATED APPLICATIONS

This application is a National Stage entry of International Application No. PCT/JP2010/062901, filed Jul. 30, 2010, which claims priority to Japanese Patent Application No. 177943/2009 filed Jul. 30, 2009, the disclosure of the prior application are incorporated in their entirety by reference.

TECHNICAL FIELD

The present invention relates to a stop control system and method for an internal combustion engine, for controlling a stop position of a piston to a predetermined position by controlling an intake air amount during stoppage of the engine.

BACKGROUND ART

When stopping the engine, it is desirable that the piston is caused to stop at a predetermined position that causes no valve overlap in which an intake valve and an exhaust valve are both opened. This is because when the engine is stopped in a state where valve overlap occurs, exhaust gases in an exhaust passage flow back into an intake passage via the exhaust valve and the intake valve during stoppage of the engine, which can result in degraded engine startability at the following start of the engine and increased exhaust emissions.

On the other hand, conventionally, as a control system for controlling the opening degree of a throttle valve during stoppage of the engine, one disclosed in Patent Literature 1 is known. In this control system, during stoppage of the engine, after an ignition switch is turned off, the throttle valve is controlled to predetermined respective opening degrees of full closing, full opening, and intermediate opening, in the mentioned order, and the opening degree of the throttle valve is learned based on the opening degrees thereof detected by a throttle position sensor during the full closing and the full opening of the throttle valve. Further, after the ignition switch is turned off, prior to the above-described full closing control, the throttle valve is held at a predetermined opening degree, whereby during the full closing control, negative pressure in an intake manifold is suppressed to prevent occurrence of untoward noise during the full open control after the full closing control.

CITATION LIST

Patent Literature

[PTL 1] Japanese Patent No. 3356033

SUMMARY OF INVENTION

Technical Problem

However, in the control system disclosed in the Patent Literature 1, the opening degree of the throttle valve is learned to merely prevent occurrence of untoward noise, by controlling the opening degree of the throttle valve during stoppage of the engine, as described above. Therefore, it is impossible to cause the piston to stop at the predetermined position during stoppage of the engine, and hence it is inevitable that the above-described inconvenience occurs due to valve overlap.

The present invention has been made to provide a solution to the above-described problems, and an object thereof is to provide a stop control system and method for an internal combustion engine, which are capable of accurately stopping a piston at a predetermined position during stoppage of the engine while preventing occurrence of untoward noise and vibration.

Solution to Problem

To attain the above object, in an aspect, the invention provides a stop control system 1 for an internal combustion engine 3, which controls a stop position of a piston 3*d* of the engine 3 to a predetermined position during stoppage of the engine 3 by controlling an intake air amount, comprising, an intake air amount-adjusting valve (throttle valve 13*a* in the embodiment (the same applies hereinafter in this section)) for adjusting the intake air amount, rotational speed-detecting means (crank angle sensor 24, ECU 2) for detecting a rotational speed of the engine 3 (engine speed NE), first intake air amount control means (ECU 2, step 30 in FIG. 5, step 34 in FIG. 6) for closing the intake air amount-adjusting valve when a command for stopping the engine 3 is issued, and thereafter executing first intake air amount control (first stage control) in which the intake air amount-adjusting valve is controlled to a first predetermined opening degree (first stage control target opening degree ICMDOFPRE) when the detected rotational speed of the engine 3 becomes equal to a first predetermined rotational speed (first stage control start rotational speed NEICOFPRE), and second intake air amount control means (ECU 2, step 33 in FIG. 5, step 42 in FIG. 6) for executing second intake air amount control (second stage control) in which the intake air amount-adjusting valve is controlled to a second predetermined opening degree ICMDOF2 larger than the first predetermined opening degree in order to stop the piston 3*d* at the predetermined position, when the rotational speed of the engine becomes equal to a second predetermined rotational speed (corrected target stop control start rotational speed NEICOFREFN) lower than the first predetermined rotational speed after the first intake air amount control.

According to this stop control system, when the command for stopping the engine is issued, the intake air amount-adjusting valve is once closed. This reduces the amount of intake air drawn into the engine to thereby reduce the rotational speed of the engine. Then, the first intake air amount control is executed in which when the rotational speed of the engine becomes equal to the first predetermined rotational speed, the intake air amount-adjusting valve is opened to control the intake air amount-adjusting valve to the first predetermined opening degree. This introduces intake air via the intake air amount-adjusting valve, and intake pressure acts as resistance to the piston to thereby further reduce the rotational speed of the engine. Further, after that, when the rotational speed of the engine becomes equal to the second predetermined rotational speed which is smaller, the second intake air amount control is executed in which the intake air amount-adjusting valve is controlled to the second predetermined opening degree larger than the first predetermined opening degree, whereby the stop position of the piston is controlled to the predetermined position.

As described above, when opening the intake air amount-adjusting valve from a closed state so as to stop the piston at the predetermined position, the intake air amount-adjusting valve is not opened to the second predetermined opening degree which is larger, at a time, but in advance of this, it is controlled to the first predetermined opening degree which is smaller. Thus, the intake air amount-adjusting valve is stepwise opened at respective times to the first predetermined opening degree and the second predetermined opening degree by separate steps, whereby it is possible to avoid a steep rise in intake pressure during opening the intake air amount-adjusting valve, thereby making it possible to prevent occurrence of untoward noise, such as flow noise, and vibration caused by the steep rise in intake pressure. Further, in the first intake air amount control, the intake air amount-adjusting valve is not progressively opened to the first predetermined opening degree but is held at the first predetermined opening degree, so that it is possible to stabilize initial conditions at the start of the second intake air amount control, such as the intake pressure, without variation, while suppressing adverse influences of variation in the operating characteristics of the intake air amount-adjusting valve, delay, etc. This makes it possible to accurately stop the piston at the predetermined position by the second intake air amount control.

In accordance with one aspect, the present invention comprises second predetermined rotational speed-setting means (ECU 2, step 28 in FIG. 5) for setting the second predetermined rotational speed according to a state of the engine 3, and first predetermined rotational speed-setting means (ECU 2, step 71 in FIG. 13) for setting the first predetermined rotational speed according to the set second predetermined rotational speed.

With this configuration, the second predetermined rotational speed for starting the second intake air amount control is set according to a state of the engine, and the first predetermined rotational speed for starting the first intake air amount control is set according to the set second predetermined rotational speed. Therefore, even when timing for starting the second intake air amount control is changed, the first intake air amount control is started in timing coping with the change in the start timing, whereby it is possible to stabilize the initial conditions for the second intake air amount control, thereby making it possible to ensure the accuracy of the stop control of the piston by the second intake air amount control.

In accordance with a further aspect, the present invention comprises second predetermined opening degree-setting means (ECU 2, steps 128, 138 in FIG. 24, FIG. 25) for setting the second predetermined opening degree (target second stage control opening degree ATHICOFREFX) according to a state of the engine 3, and first predetermined rotational speed-setting means (ECU 2, step 143 in FIG. 27) for setting the first predetermined rotational speed according to the set second predetermined opening degree.

With this configuration, the second predetermined opening degree of the intake air amount-adjusting valve is set according to a state of the engine, and the first predetermined rotational speed for starting the first intake air amount control is set according to the set second predetermined opening degree. Therefore, even when the second predetermined opening degree for use in the second intake air amount control is changed, the first intake air amount control is started in timing coping with the change in the second predetermined opening degree, whereby it is possible to stabilize the initial conditions for the second intake air amount control, thereby making it possible to ensure the accuracy of the stop control of the piston by the second intake air amount control.

In accordance with a further aspect, the present invention comprises first predetermined rotational speed-limiting means (ECU 2, steps 72, 74 in FIG. 13) for limiting the first predetermined rotational speed to a predetermined upper limit value NEPRELMT when the set first predetermined rotational speed is higher than the upper limit value NEPRELMT, and first predetermined opening degree-correcting means (ECU 2, step 75 in FIG. 13) for correcting the first predetermined opening degree such that the first predetermined opening degree is increased and at the same time is corrected to a smaller value than the second predetermined opening degree ICMDOF2, when the first predetermined rotational speed is limited.

With this configuration, when the first predetermined rotational speed set according to the change in the second predetermined rotational speed is higher than the predetermined upper limit value, the first predetermined rotational speed is limited to the upper limit value. This causes the first intake air amount control to be started after waiting for the rotational speed of the engine to be reduced to the upper limit value, so that it is possible to prevent the first intake air amount control from being executed in a resonance area where the rotational speed of the engine is high, thereby making it possible to positively prevent untoward noise and vibration caused by the resonance of the engine. Further, when the first predetermined rotational speed is limited as described above, the first predetermined opening degree is corrected to a larger value, so that by compensating for the insufficient amount of the intake air amount due to delay of start of the first intake air amount control, it is possible to stabilize the initial conditions for the second intake air amount control, thereby making it possible to ensure the accuracy of the stop control of the piston.

In accordance with a further aspect, the present invention comprises second predetermined rotational speed-setting means (ECU 2, step 28 in FIG. 5) for setting the second predetermined rotational speed according to a state of the engine 3, and first predetermined opening degree-setting means (ECU 2, steps 81, 82, 85 in FIG. 15) for setting the first predetermined opening degree according to the set second predetermined rotational speed.

With this configuration, the second predetermined rotational speed is set according to a state of the engine, and the first predetermined opening degree for the first intake air amount control is set according to the set second predetermined rotational speed. Therefore, even when the timing for starting the second intake air amount control is changed, the first intake air amount control is executed based on an intake air amount coping with the change in the start timing, whereby it is possible to stabilize the initial conditions for the second intake air amount control, thereby making it possible to ensure the accuracy of the stop control of the piston by the second intake air amount control.

In accordance with a further aspect, the present invention comprises second predetermined opening degree-setting means (ECU 2, FIG. 24, steps 128, 138 in FIG. 25) for setting the second predetermined opening degree (target second stage control opening degree ATHICOFREFX) according to a state of the engine 3, and first predetermined opening degree-setting means (ECU 2, step 113 in FIG. 24) for setting the first predetermined opening degree according to the set second predetermined opening degree.

With this configuration, the second predetermined opening degree is set according to a state of the engine, and the first predetermined opening degree for use in the first intake air amount control is set according to the set second predetermined opening degree. Therefore, even when the second predetermined opening degree for use in the second intake air amount control is changed, the first intake air amount control is executed based on an intake air amount coping with the change in the second predetermined opening degree, whereby it is possible to stabilize the initial conditions for the second intake air amount control, thereby making it possible to ensure the accuracy of the stop control of the piston by the second intake air amount control.

In accordance with a further aspect, the present invention comprises detection means (intake air temperature sensor 22, atmospheric pressure sensor 23, engine coolant temperature sensor 26) for detecting at least one of a temperature of intake air drawn into the engine 3 (intake air temperature TA), an atmospheric pressure PA, and a temperature of the engine 3 (engine coolant temperature TW), and first correction means (ECU 2, steps 83 to 85 in FIG. 15) for correcting at least one of the first predetermined rotational speed and the first predetermined opening degree according to at least one of the temperature of intake air, the atmospheric pressure PA, and the temperature of the engine, which are detected.

With this configuration, at least one of the temperature of intake air, the atmospheric pressure, and the temperature of the engine is detected. These three parameters all have influence on the degree of rise in the intake pressure and the rate of reduction of the rotational speed of the engine during the intake air amount control. Specifically, as the temperature of intake air and the temperature of the engine are lower, the sliding friction of the piston becomes larger, so that the rate of reduction of the rotational speed of the engine becomes larger. Further, as the atmospheric pressure is higher, or as the temperature of intake air is lower, the density of intake air becomes higher, and hence the degree of rise in intake pressure becomes higher even when the intake air amount is the same, and in accordance therewith, the rate of reduction of the rotational speed of the engine becomes larger. According to the present invention, in the first intake air amount control, at least one of the first predetermined rotational speed and the first predetermined opening degree is corrected according to at least one of these parameters which are detected. Therefore, it is possible to stabilize the initial conditions for the second intake air amount control, thereby making it possible to ensure the accuracy of the stop control of the piston while accommodating influence of differences in the degree of rise in intake pressure and the rate of reduction of the rotational speed of the engine dependent on at least one of the parameters.

In accordance with a further aspect, the present invention comprises detection means (intake air temperature sensor 22, atmospheric pressure sensor 23, engine coolant temperature sensor 26) for detecting at least one of a temperature of intake air drawn into the engine 3 (intake air temperature TA), an atmospheric pressure PA, and a temperature of the engine 3 (engine coolant temperature TW), and second correction means (ECU 2, steps 26 to 28 in FIG. 5) for correcting at least one of the second predetermined rotational speed and the second predetermined opening degree according to at least one of the temperature of intake air, the atmospheric pressure PA, and the temperature of the engine, which are detected.

With this configuration, at least one of the temperature of intake air, the atmospheric pressure, and the temperature of the engine is detected. As described above, these three parameters all have influence on the degree of rise in the intake pressure, the rate of reduction of the rotational speed of the engine, and further the stop characteristics of the piston during the intake air amount control. Therefore, at least one of the second predetermined rotational speed and the second predetermined opening degree is corrected during the second intake air amount control according to one of these parameters which are detected, whereby it is possible to accommodate influence of differences in the stop characteristics of the piston, thereby making it possible to enhance the accuracy of the stop control of the piston.

In accordance with a further aspect, the present invention comprises a stop control method for an internal combustion engine, which controls a stop position of a piston 3*d* of the engine 3 to a predetermined position during stoppage of the engine 3 by controlling an intake air amount, comprising a step of detecting a rotational speed of the engine 3 (engine speed NE in the embodiment (the same applies hereinafter in this section)), a step of closing an intake air amount-adjusting valve (throttle valve 13*a*) for adjusting the intake air amount when a command for stopping the engine 3 is issued, and thereafter executing first intake air amount control (first stage control) in which the intake air amount-adjusting valve is controlled to a first predetermined opening degree (first stage control target opening degree ICMDOFPRE) when the detected rotational speed of the engine 3 becomes equal to a first predetermined rotational speed (first stage control start rotational speed NEICOFPRE), and a step of executing second intake air amount control (second stage control) in which the intake air amount-adjusting valve is controlled to a second predetermined opening degree ICMDOF2 larger than the first predetermined opening degree in order to stop the piston 3*d* at the predetermined position, when the rotational speed of the engine becomes equal to a second predetermined rotational speed (corrected target stop control start rotational speed NEICOFREFN) lower than the first predetermined rotational speed after the first intake air amount control.

In accordance with a further aspect, the present invention comprises a step of setting the second predetermined rotational speed according to a state of the engine 3, and a step of setting the first predetermined rotational speed according to the set second predetermined rotational speed.

In accordance with a further aspect, the present invention comprises a step of setting the second predetermined opening degree according to a state of the engine 3, and a step of setting the first predetermined rotational speed according to the set second predetermined opening degree.

In accordance with a further aspect, the present invention comprises a step of limiting the first predetermined rotational speed to a predetermined upper limit value NEPRELMT when the set first predetermined rotational speed is higher than the upper limit value NEPRELMT, and a step of correcting the first predetermined opening degree such that the first predetermined opening degree is increased and at the same time is corrected to a smaller value than the second predetermined opening degree ICMDOF2, when the first predetermined rotational speed is limited.

In accordance with a further aspect, the present invention comprises a step of setting the second predetermined rotational speed according to a state of the engine 3, and a step of setting the first predetermined opening degree according to the set second predetermined rotational speed.

In accordance with a further aspect, the present invention comprises a step of setting the second predetermined opening degree according to a state of the engine 3, and a step of setting the first predetermined opening degree according to the set second predetermined opening degree.

In accordance with a further aspect, the present invention comprises a step of detecting at least one of a temperature of intake air drawn into the engine 3 (intake air temperature TA), an atmospheric pressure PA, and a temperature of the engine 3 (engine coolant temperature TW), and a step of correcting at least one of the first predetermined rotational speed and the first predetermined opening degree according to at least one of the temperature of intake air, the atmospheric pressure PA, and the temperature of the engine, which are detected.

In accordance with a further aspect, the present invention comprises a step of detecting at least one of a temperature of intake air drawn into the engine 3 (intake air temperature TA), an atmospheric pressure PA, and a temperature of the engine 3 (engine coolant temperature TW), and a step of correcting at least one of the second predetermined rotational speed and the second predetermined opening degree according to at least one of the temperature of intake air, the atmospheric pressure PA, and the temperature of the engine, which are detected.

MODE FOR CARRYING OUT INVENTION

Figure 1:
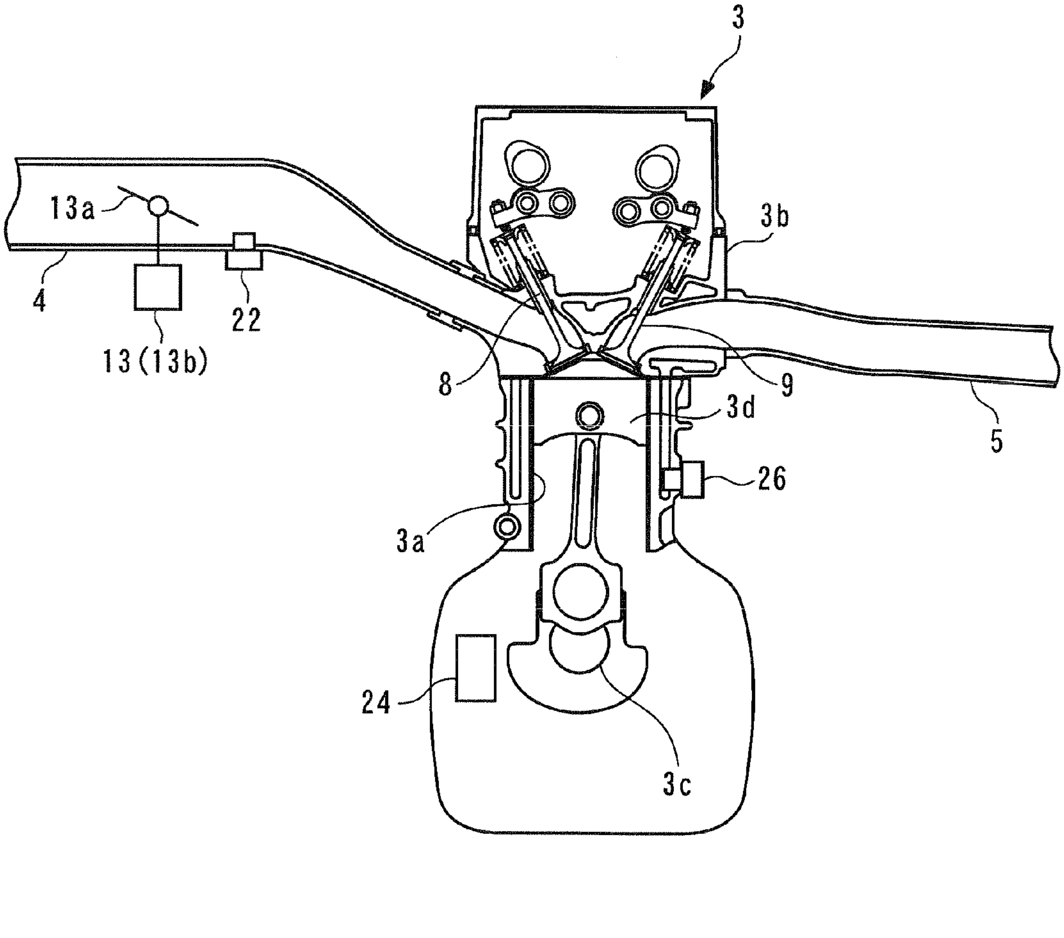
FIG. 1 A schematic view of an internal combustion engine to which a stop control system according to the present embodiment is applied.
Figure 2:
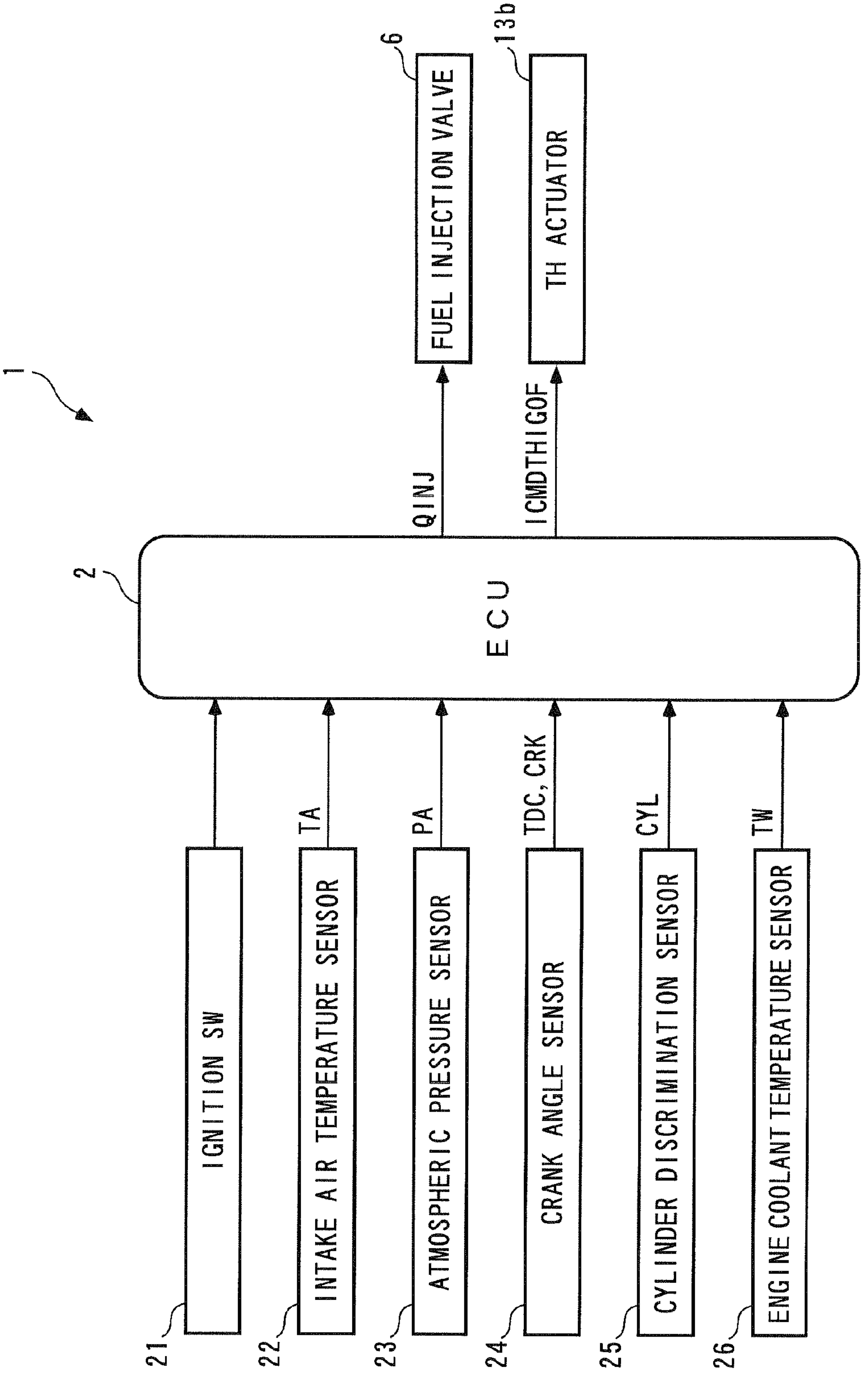
FIG. 2 A block diagram of the stop control system.

The present invention will now be described in detail with reference to the drawings showing preferred embodiments thereof. FIG. 1 schematically shows an internal combustion engine 3 to which is applied a stop control system 1 (see FIG. 2) according to the present embodiment. This internal combustion engine (hereinafter referred to as the "engine") 3 is a six-cylinder gasoline engine, for example.

Fuel injection valves 6 (see FIG. 2) are mounted on respective cylinders 3*a* of the engine 3. The opening and closing of each fuel injection valve 6 is controlled by a control signal from an ECU 2 (see FIG. 2), whereby fuel injection timing is controlled by valve-opening timing of the fuel injection valve 6, and a fuel injection amount QINJ is controlled by a valve-opening time period thereof.

Cylinder heads 3*b* of respective cylinders 3*a* of the engine 3 are connected to an intake pipe 4 and an exhaust pipe 5, cylinder by cylinder, and a pair of intake valves 8 and 8 (only one of which is shown) and a pair of exhaust valves 9 and 9 (only one of which is shown) are provide for each cylinder head 3*b*.

Figure 3:
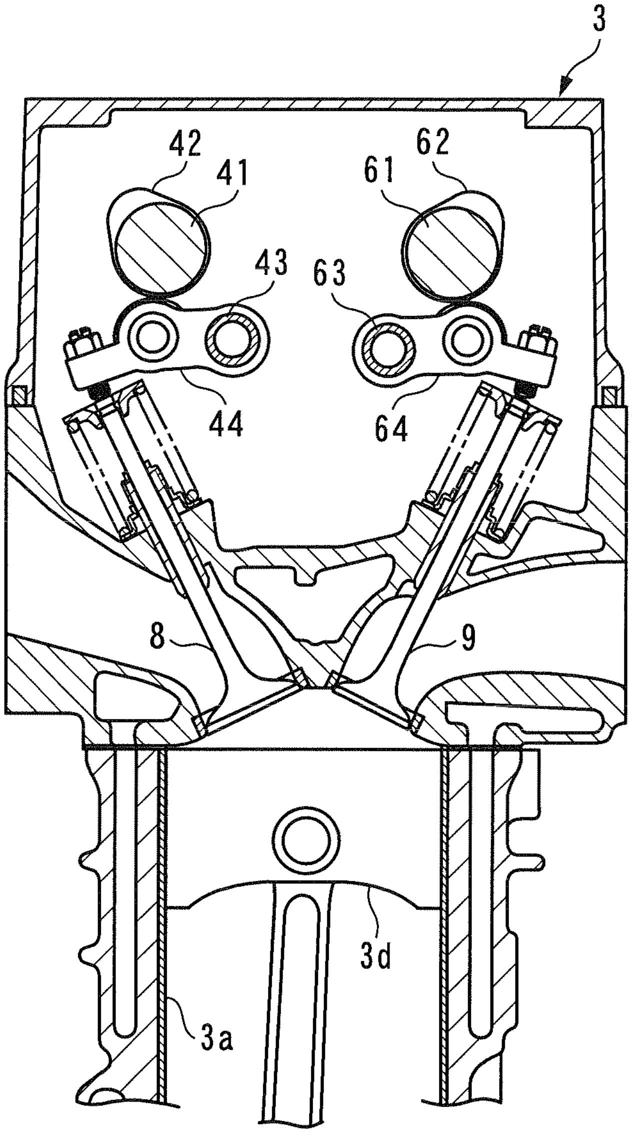
FIG. 3 A schematic cross-sectional view of an intake valve, an exhaust valve, and a mechanism for actuating the intake valve and the exhaust valve.

As shown in FIG. 3, the cylinder head 3*b* is provided therein with a rotatable intake cam shaft 41, an intake cam 42 integrally formed with the intake cam shaft 41, a rocker arm shaft 43, and two rocker arms 44 and 44 (only one of which is shown) which are pivotally supported by the rocker arm shaft 43 for being brought into abutment with respective top ends of the intake valves 8 and 8.

The intake cam shaft 41 is connected to a crankshaft 3*c* (see FIG. 1) via an intake sprocket and a timing chain (neither of which is shown), and rotates once whenever the crankshaft 3*c* rotates twice. As the intake cam shaft 41 is rotated, the rocker arms 44 and 44 are pressed by the intake cam 42 to be pivotally moved about the rocker arm shaft 43, whereby the intake valves 8 and 8 are opened and closed.

Further, the cylinder head 3*b* is provided therein with a rotatable exhaust cam shaft 61, an exhaust cam 62 integrally formed with the exhaust cam shaft 61, a rocker arm shaft 63, and two rocker arms 64 and 64 (only one of which is shown) which are pivotally supported by the rocker arm shaft 63 for being brought into abutment with respective top ends of the exhaust valves 9 and 9.

The exhaust cam shaft 61 is connected to the crankshaft 3*c* via an exhaust sprocket and a timing chain (neither of which is shown), and rotates once whenever the crankshaft 3*c* rotates twice. As the exhaust cam shaft 61 is rotated, the rocker arms 64 and 64 are pressed by the exhaust cam 62 to be pivotally moved about the rocker arm shaft 63, whereby the exhaust valves 9 and 9 are opened and closed.

Further, the intake cam shaft 41 is provided with a cylinder discrimination sensor 25. Along with rotation of the intake cam shaft 41, the cylinder discrimination sensor 25 delivers a CYL signal, which is a pulse signal, to the ECU 2 at a predetermined crank angle position of a specific cylinder 3*a*.

The crankshaft 3*c* is provided with a crank angle sensor 24. The crank angle sensor 24 delivers a TDC signal and a CRK signal, which are both pulse signals, to the ECU 2 along with rotation of the crankshaft 3*c*. The TDC signal indicates that a piston 3*d* of one of the cylinders 3*a* is at a predetermined crank angle position in the vicinity of the top dead center (TDC) at the start of the intake stroke thereof, and in the case of the six-cylinder engine as in the present embodiment, it is delivered whenever the crankshaft 3*c* rotates through 120°. The CRK signal is delivered whenever the crankshaft 3*c* rotates through a predetermined angle (e.g. 30°. The ECU 2 calculates the rotational speed of the engine 3 (hereinafter referred to as "the engine speed") NE based on the CRK signal. This engine speed NE represents the rotational speed of the engine 3. Further, the ECU 2 determines which cylinders 3*a* is in the compression stroke, based on the CYL signal and the TDC signal, and assigns cylinder numbers CUCYL 1 to 6 to the respective cylinders 3*a*, based on results of the determination.

Furthermore, the ECU 2 calculates a crank angle CA based on the TDC signal and the CRK signal, and sets a stage number STG. Assuming that a reference angle position of the crank angle CA, which corresponds to a start of the intake stroke in one of the cylinders 3*a*, is set to 0°, the stage number STG is set to 0 when the crank angle CA is within a range of $0 \le CA < 30$, to 1 when the same is within a range of $30 \le CA < 60$, to 2 when the same is within a range of $60 \le CA < 90$, and to 3 when the same is within a range of $90 \le CA < 120$. That is, the stage number STG=0 represents that one of the cylinders 3*a* is in an initial stage of the intake stroke, and at the same time, that since the engine 3 has six cylinders, another of the cylinders 3*a* is in an middle stage of the compression stroke, more specifically, is during a time period corresponding to its crank angle range of 60° to 90° after the start of the compression stroke.

The intake pipe 4 is provided with a throttle valve mechanism 13. The throttle valve mechanism 13 has a throttle valve 13*a* which is pivotally provided in the intake pipe 4 and a TH actuator 13*b* for actuating the throttle valve 13*a*. The TH actuator 13*b* is a combination of a motor and a gear mechanism (neither of which is shown), and is driven by a control signal based on a target opening degree ICMDTHIGOF delivered from the ECU 2. This varies the opening degree of the throttle valve 13*a*, whereby the amount of fresh air drawn into each cylinder 3*a* (hereinafter referred to as the "fresh air amount") is controlled.

Further, an intake air temperature sensor 22 is disposed in the intake pipe 4 at a location downstream of the throttle valve 13*a*. The intake air temperature sensor 22 detects the temperature of intake air (hereinafter referred to as the "intake air temperature") TA, and delivers a detection signal indicative of the detected intake air temperature TA to the ECU 2.

Furthermore, delivered to the ECU 2 are a detection signal indicative of atmospheric pressure PA from an atmospheric pressure sensor 23, and a detection signal indicative of the temperature of engine coolant of the engine 3 (hereinafter referred to as "the engine coolant temperature") TW from an engine coolant temperature sensor 26.

Further, a signal indicative of an on/off state of an ignition switch (SW) 21 (see FIG. 2) is delivered from the ignition switch 21 to the ECU 2. Note that during stoppage of the engine 3, when the ignition switch 21 is turned off, supply of fuel from the fuel injection valve 6 to the cylinders 3*a* is stopped.

The ECU 2 is implemented by a microcomputer comprising an I/O interface, a CPU, a RAM, and a ROM (none of which are specifically shown). The detection signals from the aforementioned switch and sensors 21 to 26 are input to the CPU after the I/O interface performs A/D conversion and waveform shaping thereon. Based on the detection signals from the above-mentioned switch and sensors, the ECU 2 determines operating conditions of the engine 3 in accordance with control programs stored in the ROM, and executes control of the engine 3 including stop control, based on the determined operating conditions.

Note that in the present embodiment, the ECU 2 corresponds to rotational speed-detecting means, first intake air amount control means, second intake air amount control means, second predetermined rotational speed-setting means, first predetermined rotational speed-setting means, second predetermined opening degree-setting means, first predetermined rotational speed-limiting means, first predetermined opening degree-correcting means, first predetermined opening degree-setting means, first correction means, and second correction means.

Next, stop control of the engine 3 according to the first embodiment, executed by the ECU 2, will be described with reference to FIGS. 4 to 14. The stop control is for controlling the stop position of the piston 3*d* to a predetermined position at which no valve overlap occurs in which the intake valve 8 and the exhaust valve 9 open at the same time, by controlling the throttle valve 13*a* toward an open side when the engine speed NE becomes lower than a stop control start rotational speed NEIGOFTH after the ignition switch 21 has been turned off, to thereby control the engine speed NE in the final compression stroke immediately before stoppage of the piston 3*d* (final compression stroke rotational speed NEPRSFTGT) to a predetermined reference value.

Figure 4:
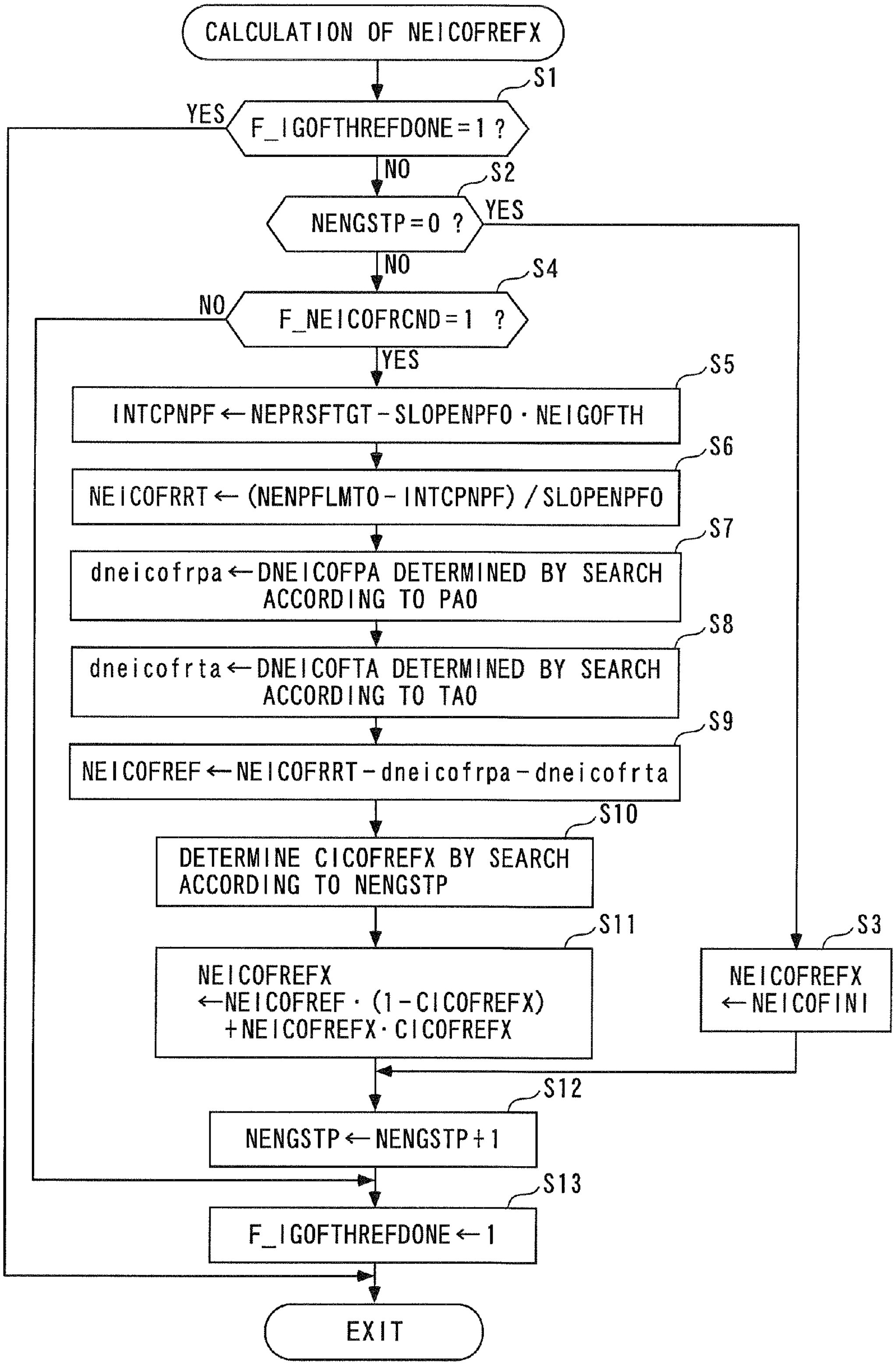
FIG. 4 A flowchart of a process for setting a target stop control start rotational speed.

FIG. 4 shows a process for setting a target stop control start rotational speed NEICOFREFX. The present process and processes described hereinafter are executed in synchronism with generation of the CYL signal. The present process is for setting a target value of the stop control start rotational speed for starting control of the throttle valve 13*a* toward the open side in the stop control (second stage control, described hereinafter) as a target stop control start rotational speed NEICOFREFX, and for learning the target value. The present process is carried out once in a single stop control process.

In the present process, first, in a step 1 (shown as "S1" in FIG. 4; the following steps are also shown in the same way), it is determined whether or not a target stop control start rotational speed setting completion flag F_IGOFTHREFDONE is equal to 1. If the answer to this question is affirmative (YES), i.e. if the target stop control start rotational speed NEICOFREFX has already been set, the present process is immediately terminated.

On the other hand, if the answer to the question of the step 1 is negative (NO), i.e. if the target stop control start rotational speed NEICOFREFX has not yet been set, in a step 2, it is determined whether or not the number of times of learning NENGSTP is equal to 0. If the answer to this question is affirmative (YES), i.e. if the number of times of learning NENGSTP has been reset e.g. by battery cancellation, the target stop control start rotational speed NEICOFREFX is set to a predetermined initial value NEICOFINI (step 3), and then the process proceeds to a step 12, referred to hereinafter.

On the other hand, if the answer to the question of the step 2 is negative (NO), it is determined in a step 4 whether or not a learning condition satisfied flag F_NEICOFRCND is equal to 1. This learning condition satisfied flag F_NEICOFRCND is set to 1 when there are satisfied predetermined learning conditions for learning the target stop control start rotational speed NEICOFREFX, including a condition that no engine stall is caused and a condition that the engine coolant temperature TW is not in a low temperature state where it is not higher than a predetermined value. If the answer to the question of the step 4 is negative (NO), i.e. if the learning conditions are not satisfied, the target stop control start rotational speed NEICOFREFX is not learned, but the process proceeds to a step 13, referred to hereinafter.

On the other hand, if the answer to the question of the step 4 is affirmative (YES), i.e. if the learning conditions for learning the target stop control start rotational speed NEICOFREFX are satisfied, the process proceeds to a step 5, wherein an intercept INTCPNPF is calculated using the final compression stroke rotational speed NEPRSFTGT obtained at the time of the immediately preceding stop control, the stop control start rotational speed NEIGOFTH, and a predetermined slope SLOPENPF0, by the following equation (1):

$$INTCPNPF=NEPRSFTGT-SLOPENPF0\cdot NEIGOFTH \quad (1)$$

Figure 9:
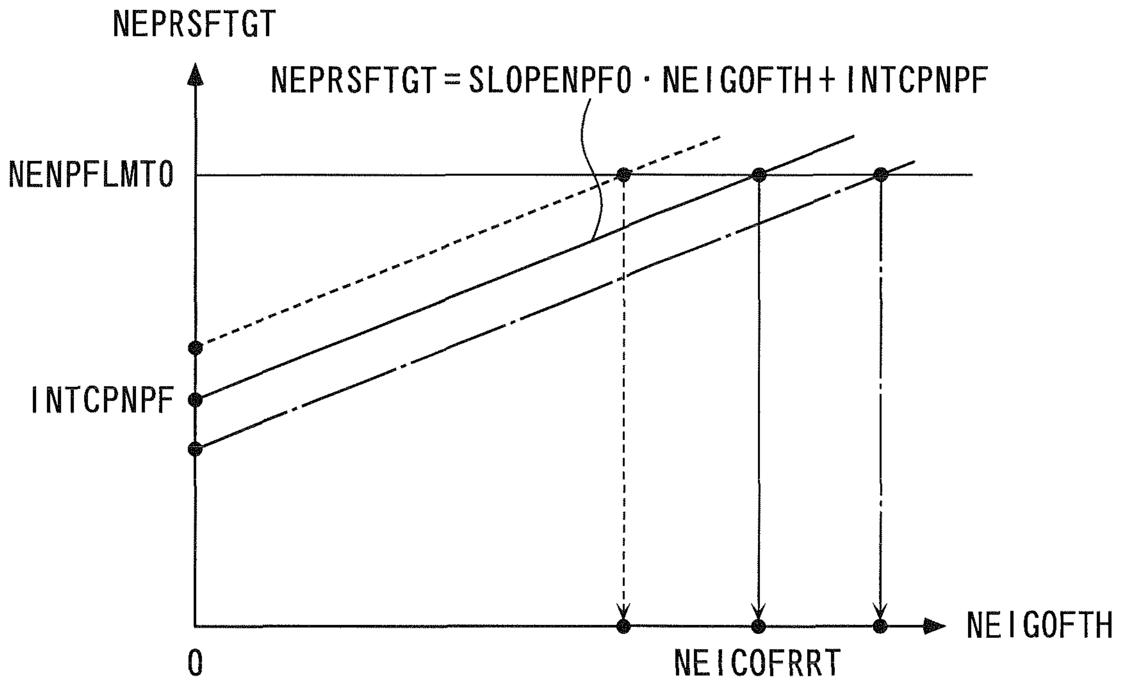
FIG. 9 A view of a correlation between a stop control start rotational speed and the final compression stroke rotational speed.

This equation (1) is based on preconditions that a correlation as shown in FIG. 9, i.e. a correlation expressed by a linear function having a slope of SLOPENPF0 and an intercept of INTCPNPF holds between the stop control start rotational speed NEIGOFTH and the final compression stroke rotational speed NEPRSFTGT, and the slope SLOPENPF0 is constant if the engine 3 is of the same type. The intercept INTCPNPF is calculated according to the above preconditions, using the stop control start rotational speed NEIGOFTH obtained during the stop control and the final compression stroke rotational speed NEPRSFTGT, by the equation (1). This determines the correlation between the stop control start rotational speed NEIGOFTH and the final compression stroke rotational speed NEPRSFTGT. Incidentally, as the friction of the piston **3*d* is larger, the final compression stroke rotational speed NEPRSFTGT takes a smaller value with respect to the same control start rotational speed NEICOFRRT, so that the linear function is offset toward a lower side (as indicated by a two-dot chain line in FIG. 9, for example), and the intercept INTCPNPF is calculated to be a smaller value. Inversely, as the friction of the piston 3*d* is smaller, the linear function is offset toward an upper side (as indicated by broken lines in FIG. 9**, for example) for the converse reason to the above, and the intercept INTCPNPF is calculated to be a larger value.

Then, in a step 6, a basic value NEICOFRRT of the target stop control start rotational speed is calculated based on the correlation determined as described above, by using the calculated intercept INTCPNPF and slope SLOPENPF0 and applying a predetermined reference value NENPFLMT0 of the final compression stroke rotational speed to the following equation (2) (see FIG. 9).

$$NEICOFRRT=(NENPFLMT0-INTCPNPF)/SLOPENPF0 \quad (2)$$

The reference value NENPFLMT0 of the final compression stroke rotational speed corresponds to such a value that will cause the piston **3*d* to stop at a predetermined position free from occurrence of valve overlap, when the final compression stroke rotational speed NEPRSF is controlled to the reference value NENPFLMT0. The reference value NENPFLMT0 is determined empirically e.g. by experiment in advance, and is set to e.g. 260 rpm in the present embodiment. Therefore, by using the basic value NEICOFRRT of the target stop control start rotational speed calculated by the above-mentioned equation (2), it is possible to stop the piston 3*d*** at the predetermined position.

Figure 10:
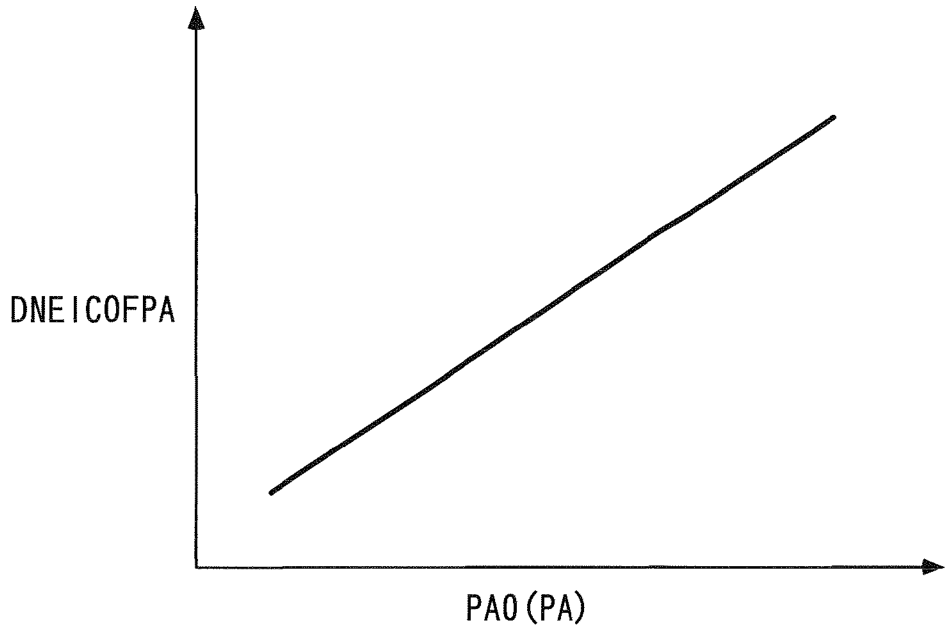
FIG. 10 A map for use in setting a learning PA correction term and a setting PA correction term.

Next, in a step 7, a map shown in FIG. 10 is searched according to the atmospheric pressure PA0 detected during the stop control to determine a map value DNEICOFPA, and the map value DNEICOFPA is set as a learning PA correction term dneicofrpa. In this map, the map value DNEICOFPA (=learning PA correction term dneicofrpa) is set to a larger value as the atmospheric pressure PA0 is higher.

Figure 11:
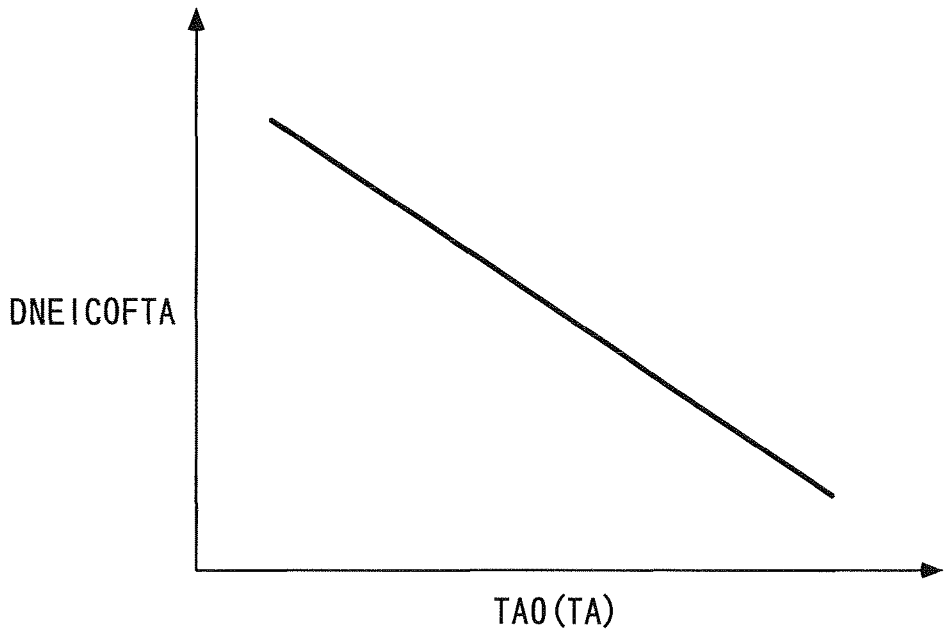
FIG. 11A map for use in setting a learning TA correction term and a setting TA correction term.

Next, in a step 8, a map shown in FIG. 11 is searched according to an intake air temperature TA0 detected during the stop control to determine a map value DNEICOFTA, and the map value DNEICOFTA is set as a learning TA correction term dneicofrta. In this map, the map value DNEICOFTA (=learning TA correction term dneicofrta) is set to a larger value as the intake air temperature TA0 is lower.

Next, a corrected basic value NEICOFREF of the target stop control start rotational speed is calculated using the basic value NEICOFRRT of the target stop control start rotational speed, the learning PA correction term dneicofrpa, and the learning TA correction term dneicofrta calculated in the steps 6 to 8, by the following equation (3) (step 9):

$$NEICOFREF=NEICOFRRT-dneicofrpa-dneicofrta \quad (3)$$

As described hereinabove, since the learning PA correction term dneicofrpa is set to a larger value as the atmospheric pressure PA0 is higher, the corrected basic value NEICOFREF of the target stop control start rotational speed is corrected to a smaller value as the atmospheric pressure PA0 is higher. Further, since the learning TA correction term dneicofrta set to a larger value as the intake air temperature TA0 is lower, the corrected basic value NEICOFREF of the target stop control start rotational speed is corrected to a smaller value as the intake air temperature TA0 is lower.

Figure 12:
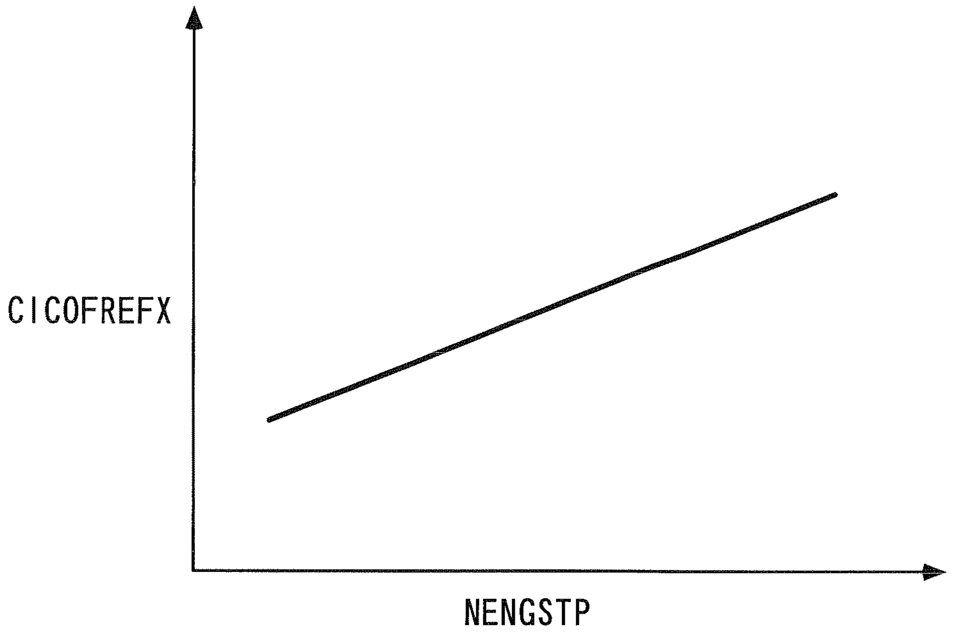
FIG. 12 A map for use in calculating an averaging coefficient.

Next, in a step 10, an averaging coefficient CICOFREFX is calculated by searching a map shown in FIG. 12 according to the number of times of learning NENGSTP. In this map, the averaging coefficient CICOFREFX is set to a larger value as the number of times of learning NENGSTP is larger (0<CICOFREFX<1).

Next, in a step 11, a current value NEICOFREFX of the target stop control start rotational speed is calculated using the calculated corrected basic value NEICOFREF of the target stop control start rotational speed, an immediately preceding value NEICOFREFX of the target stop control start rotational speed, and the averaging coefficient CICOFREFX, by the following equation (4):

$$NEICOFREFX=NEICOFREF\cdot(1-CICOFREFX)+NEICOFREFX\cdot CICOFREFX \quad (4)$$

As is clear from the above equation (4), the target stop control start rotational speed NEICOFREFX is calculated as a weighted average value of the corrected basic value NEICOFREF of the target stop control start rotational speed and the immediately preceding value NEICOFREFX of the target stop control start rotational speed, and the averaging coefficient CICOFREFX is used as a weight coefficient for weighted averaging. Therefore, the current value NEICOFREFX of the target stop control start rotational speed is calculated such that it becomes closer to the corrected basic value NEICOFREF of the target stop control start rotational speed as the averaging coefficient CICOFREFX is smaller, whereas it becomes closer to the immediately preceding value NEICOFREFX of the target stop control start rotational speed as the averaging coefficient CICOFREFX is larger. Further, the averaging coefficient CICOFREFX is set as described above according to the number of times of learning NENGSTP, and therefore as the number of times of learning NENGSTP is smaller, the degree of reflection of the corrected basic value NEICOFREF of the target stop control start rotational speed becomes larger, whereas as the number of times of learning NENGSTP is larger, the degree of reflection of the immediately preceding value NEICOFREFX of the target stop control start rotational speed becomes larger.

In the step 12 following the step 3 or 11, the number of times of learning NENGSTP is incremented. Further, if the answer to the question of the step 4 is negative (NO), or after the step 12, the proceeds to the step 13, wherein in order to indicate that the setting of the target stop control start rotational speed NEICOFREFX has been completed, the target stop control start rotational speed setting completion flag F_IGOFTHREFDONE is set to 1, followed by terminating the present process.

Figure 5:
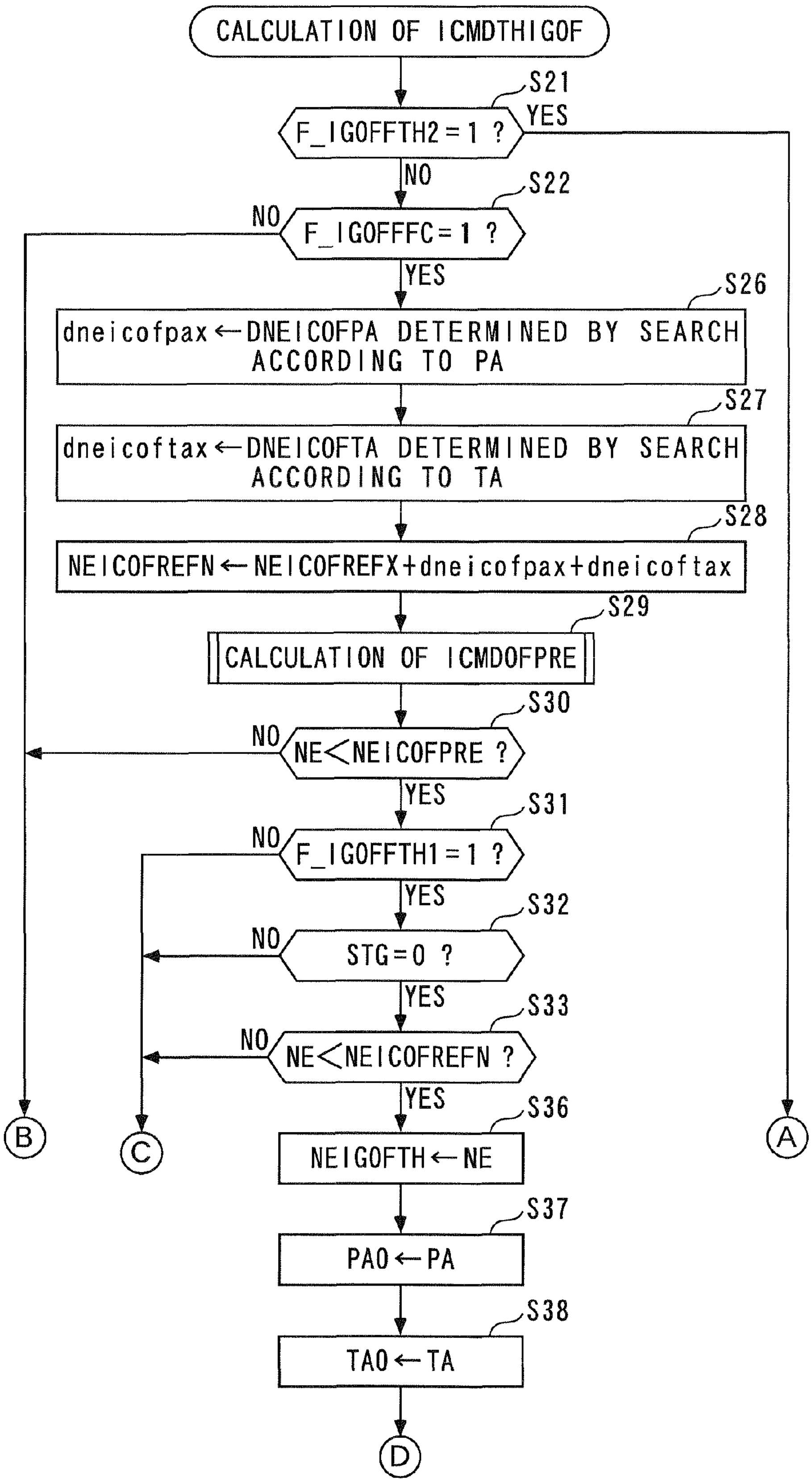
FIG. 5 A flowchart of a process for setting a target opening degree of a throttle valve.
Figure 6:
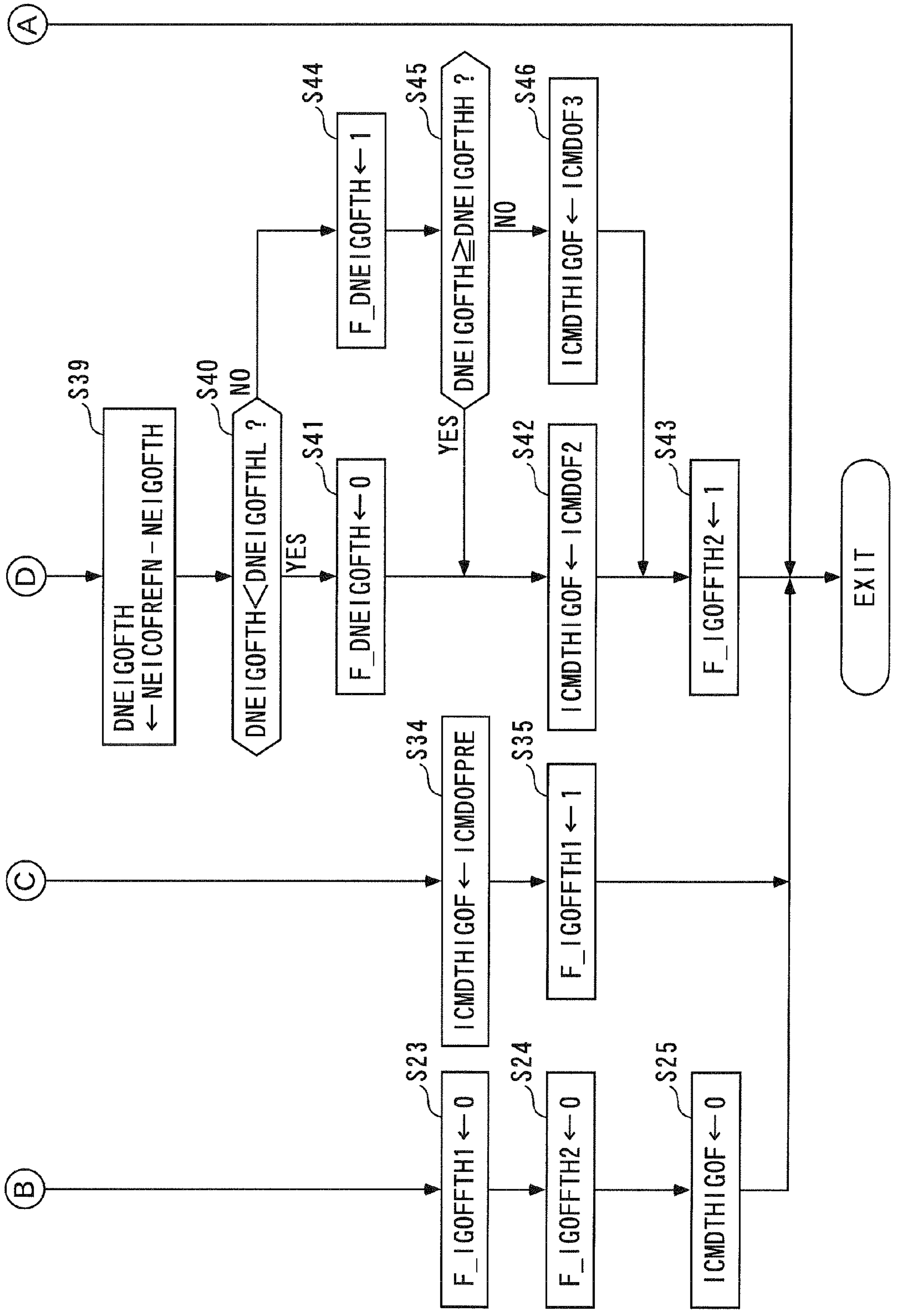
FIG. 6 A flowchart of a remaining part of the FIG. 5 setting process.

FIGS. 5 and 6 show a process for setting a target opening degree ICMDTHIGOF that serves as a target of the opening degree of the throttle valve 13*a*. In this process, after turning off the ignition switch 21, fully-closing control for controlling the target opening degree ICMDTHIGOF of the throttle valve 13*a* to 0, first stage control for setting the target opening degree ICMDTHIGOF to a first predetermined opening degree, and second stage control for setting the target opening degree ICMDTHIGOF to a second predetermined opening degree larger than the first predetermined opening degree are performed in the mentioned order according to the engine speed NE.

In the present process, first, in a step 21, it is determined whether or not a second stage control execution flag F_IGOFFTH2 is equal to 1. This second stage control execution flag F_IGOFFTH2 is set to 1 during execution of the above-described second stage control, and otherwise set to 0. If the answer to the question of the step 21 is affirmative (YES), the present process is immediately terminated.

On the other hand, if the answer to the question of the step 21 is negative (NO), it is determined in a step 22 whether or not a fuel cut flag FIGOFFFC is equal to 1. If the answer to this question is negative (NO), i.e. if interruption of fuel supply to the engine 3 has not been completed yet after turning off the ignition switch 21, a first stage control execution flag F_IGOFFTH1 and the second stage control execution flag F_IGOFFTH2 are set to 0 (steps 23 and 24), respectively, and the target opening degree ICMDTHIGOF is set to 0 (step 25), followed by terminating the present process.

On the other hand, if the answer to the question of the step 22 is affirmative (YES), i.e. if the interruption of fuel supply to the engine 3 has been completed, the above-mentioned map shown in FIG. 10 is searched according to the atmospheric pressure PA currently detected to thereby determine the map value DNEICOFPA, and the map value DNEICOFPA is set as a setting PA correction term dneicofpax (step 26).

Next, in a step 27, the above-mentioned map shown in FIG. 11 is searched according to the intake air temperature TA currently detected to thereby determine the map value DNEICOFTA, and the map value DNEICOFTA is set as a setting TA correction term dneicoftax.

Next, in a step 28, a corrected target stop control start rotational speed NEICOFREFN is calculated using the target stop control start rotational speed NEICOFREFX set in the step 11 in FIG. 4, the setting PA correction term dneicofpax, and the setting TA correction term dneicoftax calculated as described above, by the following equation (5):

$$NEICOFREFN=NEICOFREFX+dneicofpax+dneicoftax \quad (5)$$

As described hereinabove, since the setting PA correction term dneicofpax is set to a larger value as the atmospheric pressure PA is higher, the corrected target stop control start rotational speed NEICOFREFN is corrected to a larger value as the atmospheric pressure PA is higher. This is for the following reason:

As the atmospheric pressure PA is higher, the density of intake air is higher and the resistance of intake air to the piston 3*d* is larger, so that the rate of reduction of the engine speed NE becomes larger. Further, after a control signal based on the target opening degree ICMDTHIGOF is delivered, there occurs a delay before the opening degree of the throttle valve 13*a* becomes commensurate with the control signal, and a further delay occurs before an intake air amount becomes large enough to be commensurate with the opening degree of the throttle valve 13*a*. Therefore, by correcting the corrected target stop control start rotational speed NEICOFREFN to a larger value as the atmospheric pressure PA is higher, and starting the second stage control in earlier timing, it is possible to properly avoid the adverse influence of the operation of the throttle valve 13*a* and the delay of intake air, described above.

On the other hand, since the setting TA correction term dneicoftax is set to a larger value as the intake air temperature TA is lower, the corrected target stop control start rotational speed NEICOFREFN is corrected to a larger value as the intake air temperature TA is lower. As the intake air temperature TA is lower, the sliding friction of the piston 3*d* is larger and the density of intake air is higher, which increases the rate of reduction of the engine speed NE. Therefore, by correcting the corrected target stop control start rotational speed NEICOFREFN to a larger value as the intake air temperature TA is lower and starting the second stage control in earlier timing, it is possible to properly avoid the adverse influence of the operation of the throttle valve 13*a* and the delay of intake air.

Figure 13:
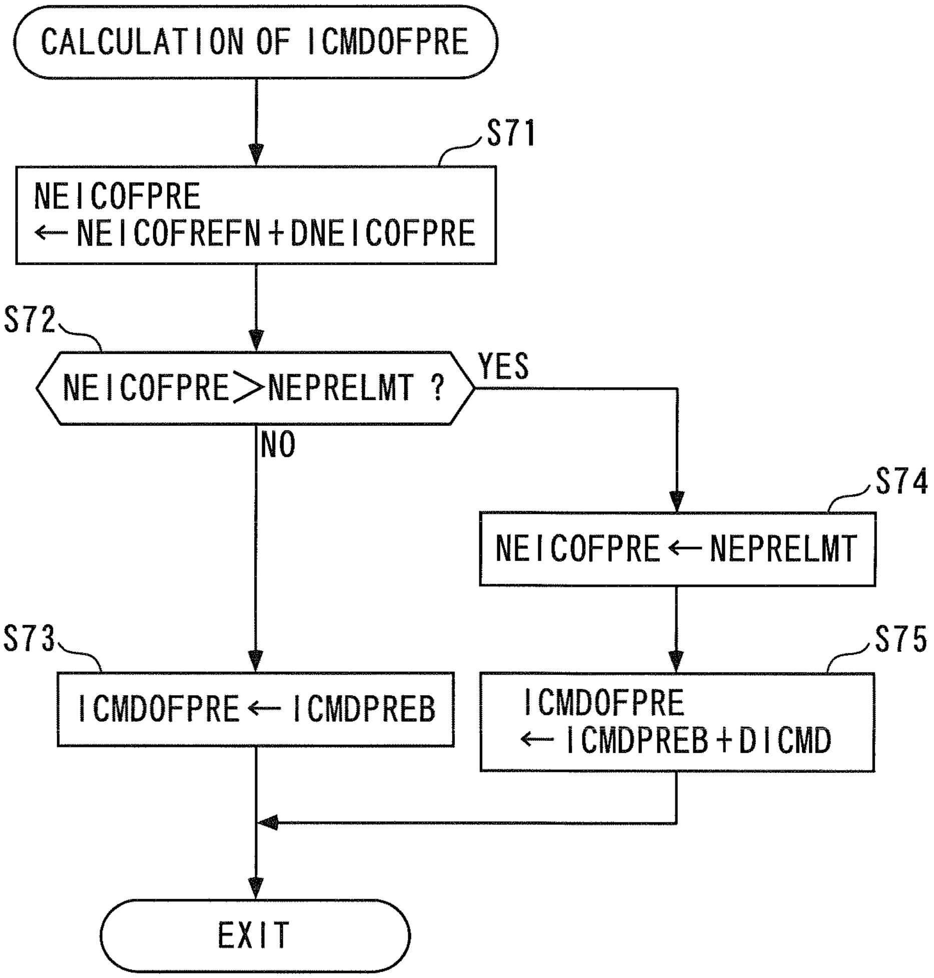
FIG. 13 A flowchart of a subroutine of a process executed in FIG. 5 for calculating a first stage control target opening degree, according to a first embodiment.

Next, in a step 29, a first stage control target opening degree ICMDOFPRE is calculated. FIG. 13 shows a subroutine of a process for calculating the first stage control target opening degree ICMDOFPRE. In the present process, first, in a step 71, a value obtained by adding a predetermined value DNEICOFPRE to the corrected target stop control start rotational speed NEICOFREFN (=NEICOFREFN+DNEICOFPRE) is calculated as a first stage control start rotational speed NEICOFPRE.

Next, it is determined whether or not the calculated first stage control start rotational speed NEICOFPRE is larger than a predetermined upper limit value NEPRELMT (step 72). This upper limit value NEPRELMT corresponds to a value at which the engine 3 might resonate if the first stage control is started in a state where the engine speed NE is higher than the upper limit value NEPRELMT, and is set to 600 rpm, for example.

If the answer to the question of the step 72 is negative (NO), i.e. if NEICOFPRE≤NEPRELMT holds, the first stage control target opening degree ICMDOFPRE is set to a predetermined basic value ICMDPREB (step 73), followed by terminating the present process.

On the other hand, if the answer to the question of the step 72 is affirmative (YES), i.e. if the first stage control start rotational speed NEICOFPRE calculated in the step 71 is higher than the upper limit value NEPRELMT, it is determined that the engine 3 might resonate, and to avoid the resonance, the first stage control start rotational speed NEICOFPRE is set to the upper limit value NEPRELMT, for limitation (step 74). Further, the first stage control target opening degree ICMDOFPRE is set to a value obtained by adding a predetermined correction term DICMD to the basic value ICMDPREB (step 75), followed by terminating the present process. Note that the corrected first stage control target opening degree ICMDOFPRE (=ICMDPREB+DICMD) is smaller than both a second predetermined opening degree ICMDOF2 and a third predetermined opening degree ICMDOF3, which are set as a target opening degree for use in the second stage control, described hereinafter.

Referring again to FIG. 5, in a step 30 following the step 29, it is determined whether or not the engine speed NE is smaller than the calculated first stage control start rotational speed NEICOFPRE. If the answer to this question is negative (NO), i.e. if NE≥NEICOFPRE holds, the above-described steps 23 to 25 are executed to thereby continue the full closing control of the throttle valve 13*a*, followed by terminating the present process.

On the other hand, if the answer to the question of the step 30 is affirmative (YES), i.e. if the engine speed NE is smaller than the first stage control start rotational speed NEICOFPRE, it is determined whether or not the first stage control execution flag F_IGOFFTH1 is equal to 1 (step 31). If the answer to this question is negative (NO), i.e. if the first stage control has not been executed yet, the target opening degree ICMDTHIGOF is set to the first stage control target opening degree ICMDOFPRE calculated in the step 29 (step 34), and the first stage control of the throttle valve 13*a* is started. Further, to indicate that the first stage control is being executed, the first stage control execution flag F_IGOFFTH1 is set to 1 (step 35), followed by terminating the present process.

On the other hand, if the answer to the question of the step 31 is affirmative (YES), i.e. if the first stage control is being executed, it is determined whether or not the stage number STG is 0 (step 32). If the answer to this question is negative (NO), i.e. if none of the cylinders 3*a* are in the middle stage of the compression stroke, the above-described steps 34 and 35 are executed, followed by terminating the present process.

On the other hand, if the answer to the question of the step 32 is affirmative (YES), i.e. if the stage number STG is 0, more specifically, if any of the cylinders 3*a* is in the middle stage of the compression stroke, it is determined whether or not the engine speed NE is smaller than the corrected target stop control start rotational speed NEICOFREFN calculated in the step 28 (step 33). If the answer to this question is negative (NO), i.e. if NEICOFREFN≤NE<NEICOFPRE holds, the above-described steps 34 and 35 are executed to thereby continue the first stage control, followed by terminating the present process.

On the other hand, if the answer to the question of the step 33 is affirmative (YES), i.e. if the stage number STG is 0, and at the same time if the engine speed NE is lower than the corrected target stop control start rotational speed NEICOFREFN, the process proceeds to a step 36, wherein the engine speed NE obtained at the time is stored as an actual stop control start rotational speed NEIGOFTH, and the atmospheric pressure PA and intake air temperature TA currently detected are stored as the atmospheric pressure PA0 and intake air temperature TA0 detected during the stop control, respectively, (steps 37 and 38). The stored stop control start rotational speed NEIGOFTH is used in the aforementioned equation (1), and the atmospheric pressure PA0 and the intake air temperature TA0 are used in the steps 7 and 8 in FIG. 4 for calculating the learning PA correction term dneicofrpa and the learning TA correction term dneicofrta, respectively.

In a step 39 following the step 38, the difference between the corrected target stop control start rotational speed NEICOFREFN and the actual stop control start rotational speed NEIGOFTH (=NEICOFREFN−NEIGOFTH) is calculated as a difference DNEIGOFTH.

Next, in a step 40, it is determined whether or not the above difference DNEIGOFTH is smaller than a predetermined first reference value DNEIGOFTHL. If the answer to this question is affirmative (YES), it is judged that the difference DNEIGOFTH is small, and hence to indicate the fact, a rotational speed difference flag F_DNEIGOFTH is set to 0 (step 41), and the target opening degree ICMDTHIGOF is set to the second predetermined opening degree ICMDOF2 for use in the second stage control (step 42). This second predetermined opening degree ICMDOF2 is larger than the first stage control target opening degree ICMDOFPRE for use in the first stage control. Then, to indicate that the second stage control is being executed, the second stage control execution flag F_IGOFFTH2 is set to 1 (step 43), followed by terminating the present process.

On the other hand, if the answer to the question of the step 40 is negative (NO), i.e. if DNEIGOFTH≥DNEIGOFTHL holds, it is judged that the difference between the corrected target stop control start rotational speed NEICOFREFN and the actual stop control start rotational speed NEIGOFTH is large, and hence to indicate the fact, the rotational speed difference flag F_DNEIGOFTH is set to 1 (step 44). Then, it is determined whether or not the difference DNEIGOFTH is not smaller than a predetermined second reference value DNEIGOFTHH which is larger than the first reference value DNEIGOFTHL (step 45). If the answer to this question is affirmative (YES), i.e. if DNEIGOFTH≥DNEIGOFTHH holds, the process proceeds to the step 42, wherein the target opening degree ICMDTHIGOF is set to the second predetermined opening degree ICMDOF2, and the above-mentioned step 43 is executed, followed by terminating the present process.

On the other hand, if the answer to the question of the step 45 is negative (NO), i.e. if DNEIGOFTHL≤DNEIGOFTH<DNEIGOFTHH holds, the target opening degree ICMDTHIGOF is set to a third predetermined opening degree ICMDOF3 (step 46), and the step 43 is executed, followed by terminating the present process. This third predetermined opening degree ICMDOF3 is larger than the first stage control target opening degree ICMDOFPRE, and is smaller than the second predetermined opening degree ICMDOF2.

Figure 7:
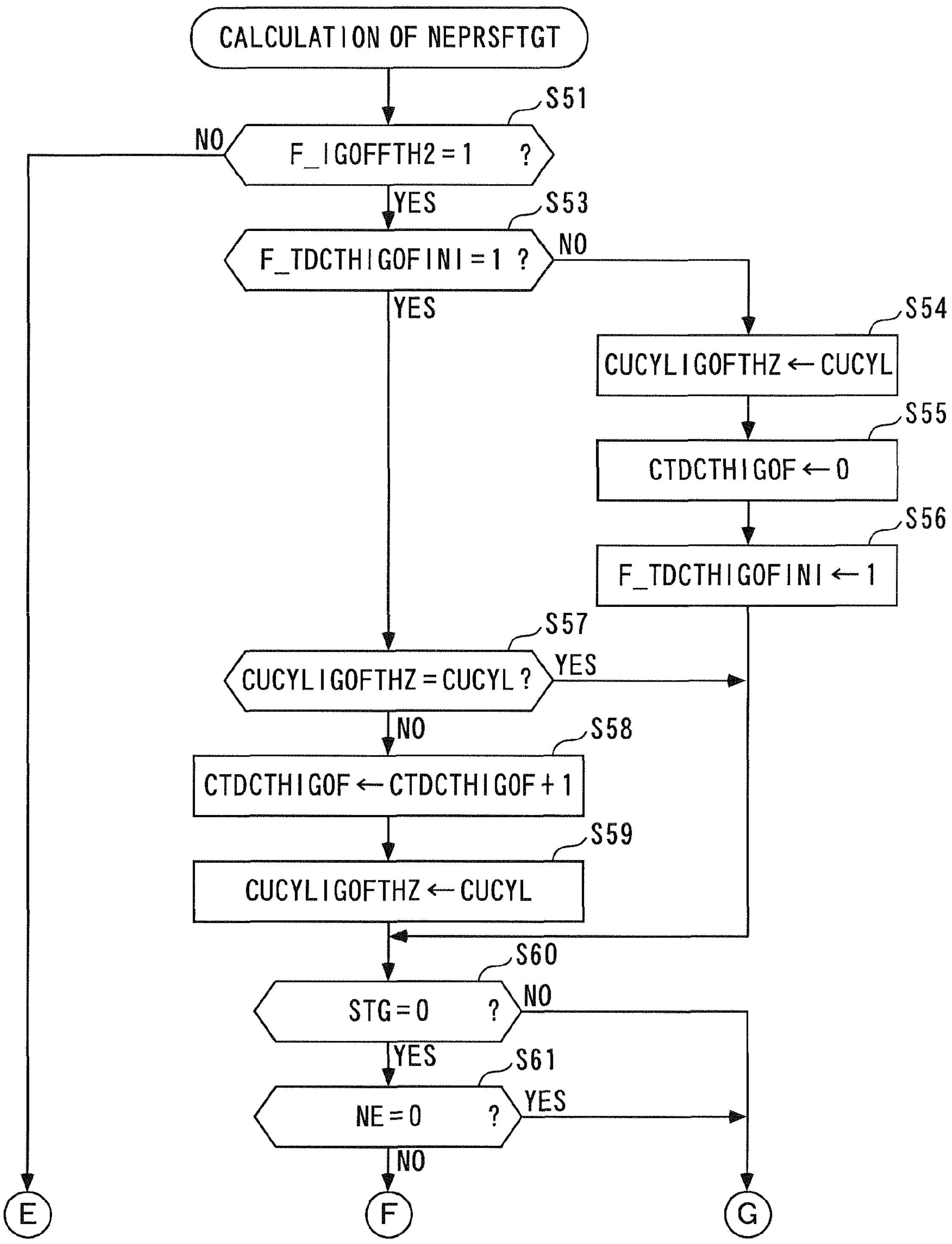
FIG. 7 A flowchart of a process for calculating a final compression stroke rotational speed.
Figure 8:
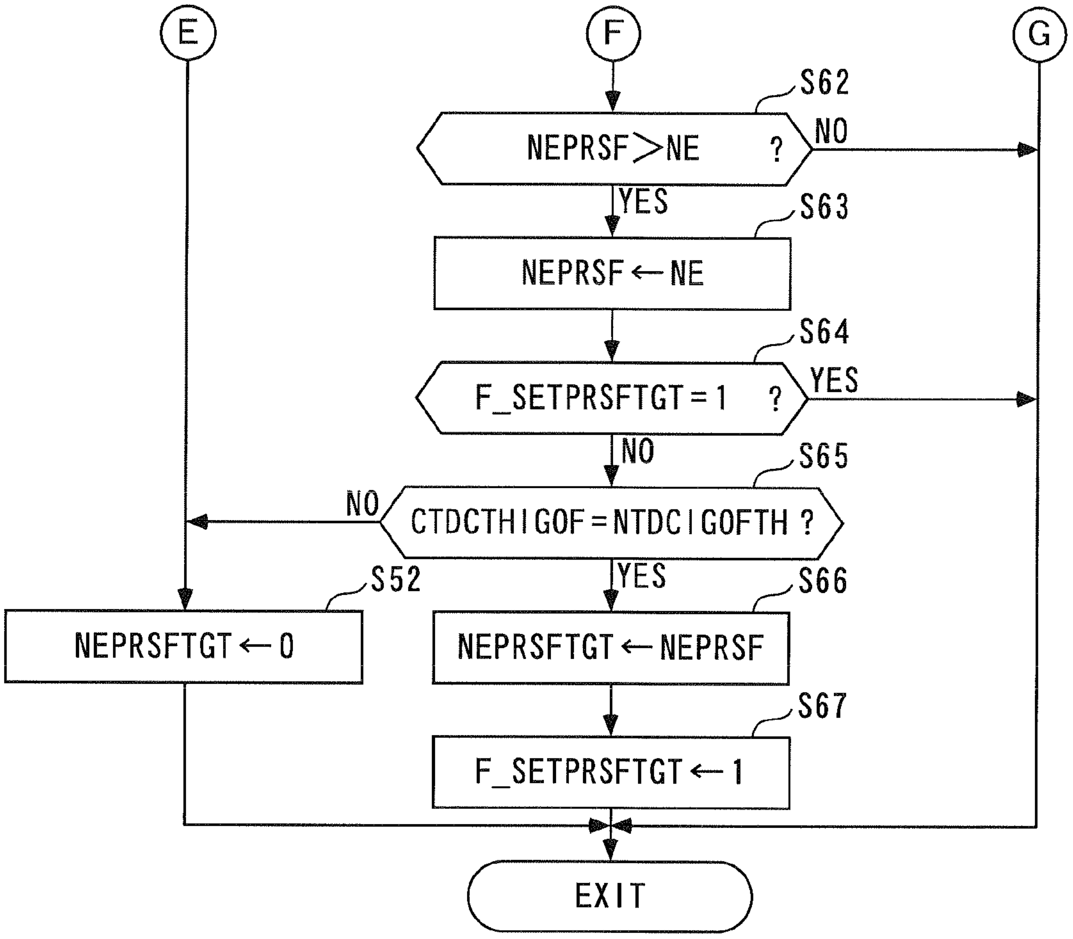
FIG. 8 A flowchart of a remaining part of the FIG. 7 calculation process.

FIGS. 7 and 8 show a process for calculating the final compression stroke rotational speed NEPRSFTGT. In the present process, first, in a step 51, it is determined whether or not the second stage control execution flag F_IGOFFTH2 is equal to 1. If the answer to this question is negative (NO), i.e. if the second stage control is not being executed, the final compression stroke rotational speed NEPRSFTGT is set to 0 (step 52), followed by terminating the present process.

On the other hand, if the answer to the question of the step 51 is affirmative (YES), i.e. if the second stage control is being executed, it is determined in a step 53 whether or not an initialization completion flag F_TDCTHIGOFINI is equal to 1. If the answer to this question is negative (NO), the cylinder number CUCYL assigned at the time is shifted to an immediately preceding value CUCYLIGOFTHZ thereof (step 54). Further, a TDC counter value CTDCTHIGOF for measuring the number of times of occurrence of TDC after the start of the second stage control is reset to 0 (step 55), and to indicate that the above-mentioned initialization has been completed, the initialization completion flag F_TDCTHIGOFINI is set to 1 (step 56). Then, the process proceeds to a step 60, described hereinafter.

On the other hand, if the answer to the question of the step 53 is affirmative (YES), i.e. if the above-mentioned initialization has already been performed, it is determined whether or not the immediately preceding value CUCYLIGOFTHZ of the cylinder number and the cylinder number CUCYL assigned at the time are equal to each other (step 57). If the answer to this question is affirmative (YES), the process proceeds to the step 60, described hereinafter.

On the other hand, if the answer to the question of the step 57 is negative (NO), i.e. if CUCYLIGOFTHZ≠CUCYL holds, it is determined that TDC has occurred, and the TDC counter value CTDCTHIGOF is incremented (step 58). Then, the cylinder number CUCYL assigned at the time is shifted to the immediately preceding value CUCYLIGOFTHZ thereof (step 59), and then the process proceeds to the step 60.

In the step 60, it is determined whether or not the stage number STG is 0, and in a step 61, it is determined whether or not the engine speed NE is equal to 0. If the answer to the question of the step 60 is negative (NO), i.e. if none of the cylinders 3*a* are in the middle stage of the compression stroke, or if the answer to the question of the step 61 is affirmative (YES), i.e. if the engine 3 has been completely stopped, the present process is terminated.

On the other hand, if the answer to the question of the step 60 is affirmative (YES), i.e. if one of the cylinders 3*a* is in the middle stage of the compression stroke, and at the same time if the answer to the question of the step 61 is negative (NO), i.e. if the engine 3 has not been completely stopped, it is determined in a step 62 whether or not a provisional value NEPRSF of the final compression stroke rotational speed is larger than the engine speed NE obtained at the time. If the answer to this question is negative (NO), i.e. if NEPRSF≤NE holds, the present process is terminated.

On the other hand, if the answer to the question of the step 62 is affirmative (YES), i.e. if NEPRSF>NE holds, the engine speed NE is stored as the provisional value NEPRSF of the final compression stroke rotational speed (step 63), and then it is determined in a step 64 whether or not a final compression stroke rotational speed calculation completion flag F_SETPRSFTGT is equal to 1. If the answer to this question is affirmative (YES), i.e. if calculation of the final compression stroke rotational speed NEPRSFTGT has already been completed, the present process is terminated.

On the other hand, if the answer to the question of the step 64 is negative (NO), i.e. if the calculation of the final compression stroke rotational speed NEPRSFTGT has not been completed yet, it is determined whether or not the TDC counter value CTDCTHIGOF is equal to a predetermined value NTDCIGOFTH (STEP 65). This predetermined value NTDCIGOFTH is determined in advance by determining empirically e.g. by experiment how many times of occurrence of TDC after the start of the second stage control will bring about the final compression stroke, and is set to e.g. 3 in the present embodiment.

If the answer to the question of the step 65 is negative (NO), it is judged that the final compression stroke has not been reached, and hence the process proceeds to the step 52, wherein the final compression stroke rotational speed NEPRSFTGT is set to 0, followed by terminating the present process.

On the other hand, if the answer to the question of the step 65 is affirmative (YES), it is determined that the final compression stroke has been reached, and the provisional value NEPRSF stored in the step 63 is calculated as the final compression stroke rotational speed NEPRSFTGT (step 66). Further, the final compression stroke rotational speed calculation completion flag F_SETPRSFTGT is set to 1 (step 67), followed by terminating the present process. In the following stop control, the final compression stroke rotational speed NEPRSFTGT thus calculated is applied to the aforementioned equation (1), and is used for setting the target stop control start rotational speed NEICOFREFX.

Figure 14:
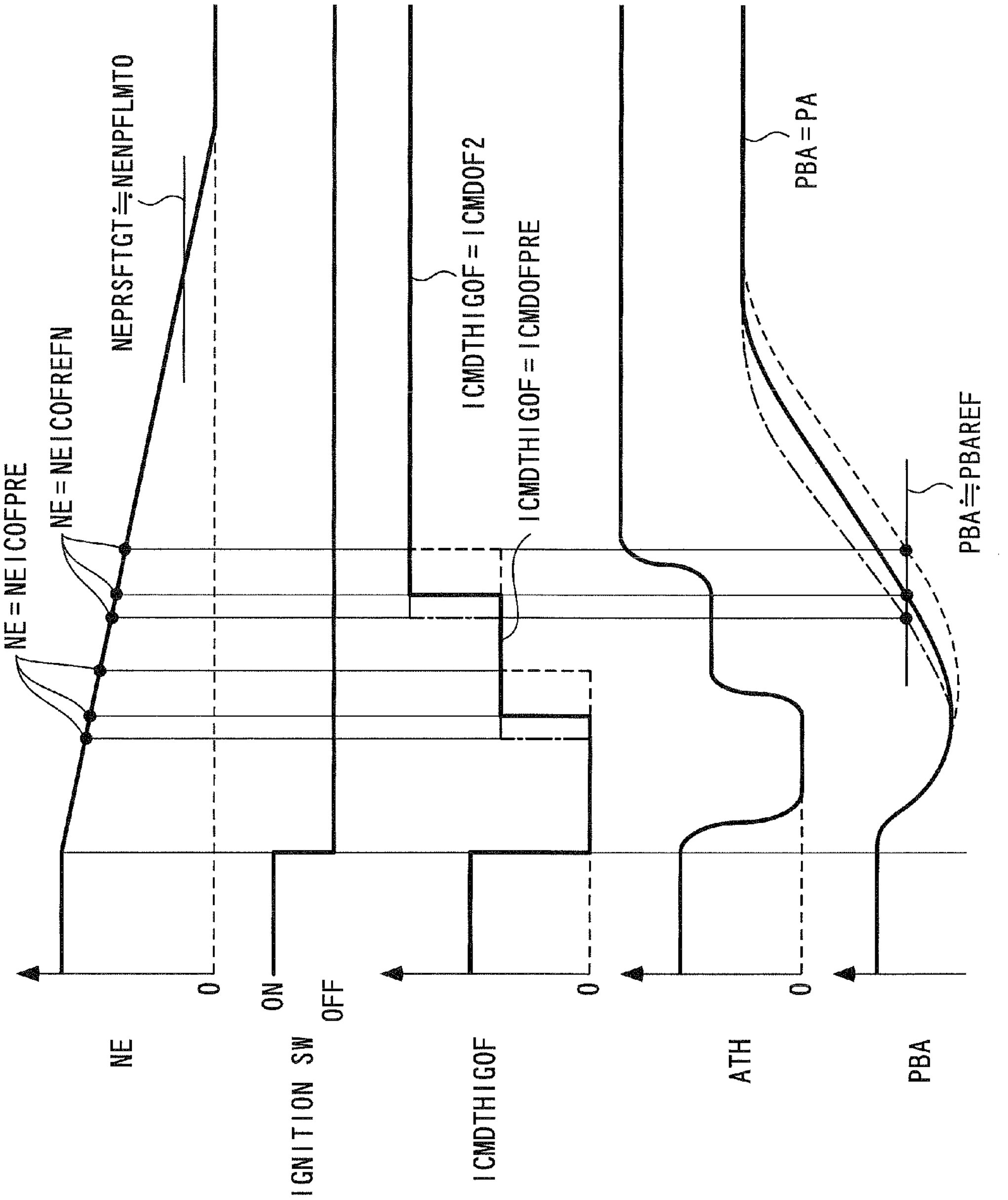
FIG. 14 A timing diagram showing an example of an operation obtained by a stop control process of the engine according to the first embodiment.

FIG. 14 shows an example of an operation obtained by a stop control process of the engine 3 according to the above-described first embodiment. In a case indicated by solid lines in the figure, when the ignition switch (SW) 21 is turned off, the supply of fuel from the fuel injection valve 6 is stopped, whereby the engine speed NE is lowered. Further, at this time, the target opening degree ICMDTHIGOF is set to 0, whereby the opening degree of the throttle valve 13*a* (throttle valve opening ATH) is controlled such that the throttle valve 13*a* is fully closed, and in accordance therewith, the intake pressure PBA is reduced. After that, when the engine speed NE becomes lower than the first stage control start rotational speed NEICOFPRE, the first stage control is started, and the target opening degree ICMDTHIGOF is set to the first stage control target opening degree ICMDOFPRE, whereby the throttle valve opening ATH is controlled toward the open side, and in accordance therewith, the intake pressure PBA increases.

Then, when the engine speed NE becomes lower than the corrected target stop control start rotational speed NEICOFREFN, the first stage control is terminated, and the second stage control is started. At this time point, the intake pressure PBA has increased up to a desired initial value PBAREF. Along with the second stage control, the target opening degree ICMDTHIGOF is set to the second predetermined opening degree ICMDOF2, whereby the throttle valve opening ATH becomes larger. In accordance therewith, the intake pressure PBA increases from the initial value PBAREF to the atmospheric pressure PA. As a consequence, the final compression stroke rotational speed NEPRSFTGT becomes approximately equal to the reference value NENPFLMT0, whereby it is possible to accurately stop the piston 3*d* at the predetermined position to prevent valve overlap.

On the other hand, in a case indicated by broken lines in the figure, the corrected target stop control start rotational speed NEICOFREFN is set to a smaller value than in the above-described case indicated by solid lines, and accordingly the first stage control start rotational speed NEICOFPRE is set to a smaller value (step 71 in FIG. 13). This causes the second stage control to be started in later timing than in the above-described case indicated by solid lines, and in accordance with, the first stage control is also started in later timing. As a consequence, the intake pressure PBA at the start of the second stage control is approximately equal to the desired initial value PBAREF. Therefore, similarly to the case indicated by solid lines, it is possible to accurately stop the piston 3*d* at the predetermined position.

Further, in a case indicated by one-dot chain lines in the figure, the corrected target stop control start rotational speed NEICOFREFN is set to a larger value than in the above-described case indicated by solid lines, and accordingly, inversely to the case indicated by broken lines, the first stage control start rotational speed NEICOFPRE is set to a larger value (step 71 in FIG. 13). This causes the second stage control to be started in earlier timing than in the case indicated by the solid lines, and in accordance therewith, the first stage control is also started in earlier timing. As a consequence, the intake pressure PBA at the start of the second stage control is approximately equal to the desired initial value PBAREF. Therefore, similarly to the case indicated by solid lines, it is possible to accurately stop the piston 3*d* at the predetermined position.

As described above, according to the present embodiment, during stoppage of the engine 3, when opening the throttle valve 13*a* from the fully-closed state (step 25 in FIG. 6) in order to control the stop position of the piston 3*d*, first, the target opening degree ICMDTHIGOF of the throttle valve 13*a* is set to the first stage control target opening degree ICMDOFPRE by the first stage control (step 34 in FIG. 6), and then is set to the second predetermined opening degree ICMDOF2 or the third predetermined opening degree ICMDOF3, larger than the first stage control target opening degree ICMDOFPRE, by the second stage control (steps 42 and 46 in FIG. 6).

As described above, by opening the throttle valve 13*a* in two stages, it is possible to avoid a steep rise in the intake pressure PBA during opening the throttle valve 13*a*, thereby making it possible to prevent occurrence of untoward noise, such as flow noise, and vibration caused by the steep increase in the intake pressure PBA. Further, in the first stage control, the target opening degree ICMDTHIGOF of the throttle valve 13*a* is not progressively increased but is held at the first stage control target opening degree ICMDOFPRE, and hence it is possible to stabilize initial conditions, such as the intake pressure PBA, at the start of the second stage control, while suppressing adverse influences of variation in the operating characteristics of the throttle valve 13*a* and delay in operation. This makes it possible to accurately stop the piston 3*d* at the predetermined position by the second stage control.

Further, when the corrected target stop control start rotational speed NEICOFREFN is changed according to the correlation between the stop control start rotational speed NEIGOFTH and the final compression stroke rotational speed NEPRSFTGT, the first stage control start rotational speed NEICOFPRE is set to a value obtained by adding the predetermined value DNEICOFPRE to the changed corrected target stop control start rotational speed NEICOFREFN (step 71 in FIG. 13). Therefore, even when timing for starting the second stage control is changed, the first stage control is started in timing coping with the change in the start timing, whereby it is possible to stabilize the initial conditions for the second stage control, thereby making it possible to ensure the accuracy of the stop control of the piston 3*d* by the second stage control.

Furthermore, if the first stage control start rotational speed NEICOFPRE set according to the corrected target stop control start rotational speed NEICOFREFN is larger than the upper limit value NEPRELMT, the first stage control start rotational speed NEICOFPRE is limited to the upper limit value NEPRELMT (steps 72 and 74 in FIG. 13). This causes the first stage control to be started after waiting for the engine speed NE to be lowered to the upper limit value NEPRELMT, so that it is possible to avoid execution of the first stage control in a resonance area where the engine speed NE is high, thereby making it possible to positively prevent untoward noise and vibration caused by the resonance of the engine 3.

Further, when the first stage control start rotational speed NEICOFPRE is limited as described above, the first stage control target opening degree ICMDOFPRE is corrected to a larger value (step 75 in FIG. 13), so that by compensating for the insufficient amount of the intake air amount due to delay of start of the first stage control, it is possible to stabilize the initial conditions for the second stage control, thereby making it possible to ensure the accuracy of the stop control of the piston 3*d*.

Further, since the target stop control start rotational speed NEICOFREFX is corrected according to the actual atmospheric pressure PA and intake air temperature TA to calculate the corrected target stop control start rotational speed NEICOFREFN (steps 26 to 28 in FIG. 5), it is possible to more properly set the corrected target stop control start rotational speed NEICOFREFN, thereby making it possible to further enhance the accuracy of the stop control of the piston 3*d*.

Note that although in the above-described first embodiment, the first stage control start rotational speed NEICOFPRE is calculated by adding the predetermined value DNEICOFPRE to the corrected target stop control start rotational speed NEICOFREFN, this value may be further corrected by the atmospheric pressure PA and the intake air temperature TA. Specifically, first, the aforementioned map shown in FIG. 10 is searched according to the atmospheric pressure PA to determine the map value DNEICOFPA, and the map value DNEICOFPA is set as a setting PA correction term dneicofpax1. Further, the aforementioned map shown in FIG. 11 is searched according to the intake air temperature TA to determine the map value DNEICOFTA, and the map value DNEICOFTA is set as a setting TA correction term dneicoftax1. Then, the first stage control start rotational speed NEICOFPRE is calculated using the determined map values by the following equation (6):

$$NEICOFPRE=NEICOFREFN+DNEICOFPRE+dneicofpax1+dneicoftax1 \qquad (6)$$

By the setting the maps in FIGS. 10 and 11, the above-mentioned setting PA correction term dneicofpax1 is set to a larger value as the atmospheric pressure PA is higher, and the setting TA correction term dneicoftax1 is set to a larger value as the intake air temperature TA is lower.

Therefore, the first stage control start rotational speed NEICOFPRE is corrected such that it becomes larger as the atmospheric pressure PA is higher and as the intake air temperature TA is lower. This makes it possible to set the first stage control start rotational speed NEICOFPRE in a more fine-grained manner according to the actual atmospheric pressure PA and intake air temperature TA, to more properly control an intake pressure PBA at the start of the second stage control, and therefore it is possible to further enhance the accuracy of the stop control of the piston 3*d*.

Figure 22:
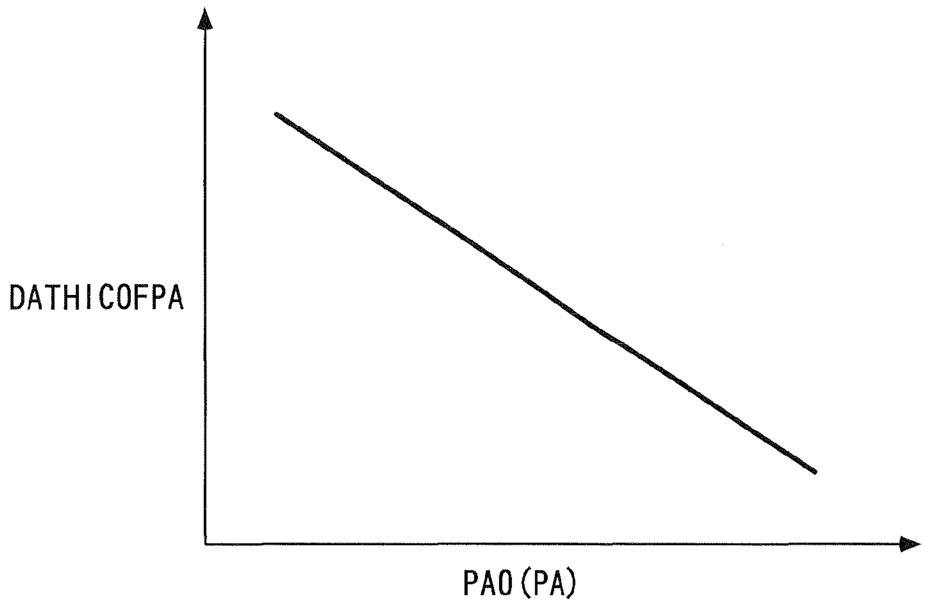
FIG. 22 A map for use in setting a learning PA correction term and a setting PA correction term according to the third embodiment.
Figure 23:
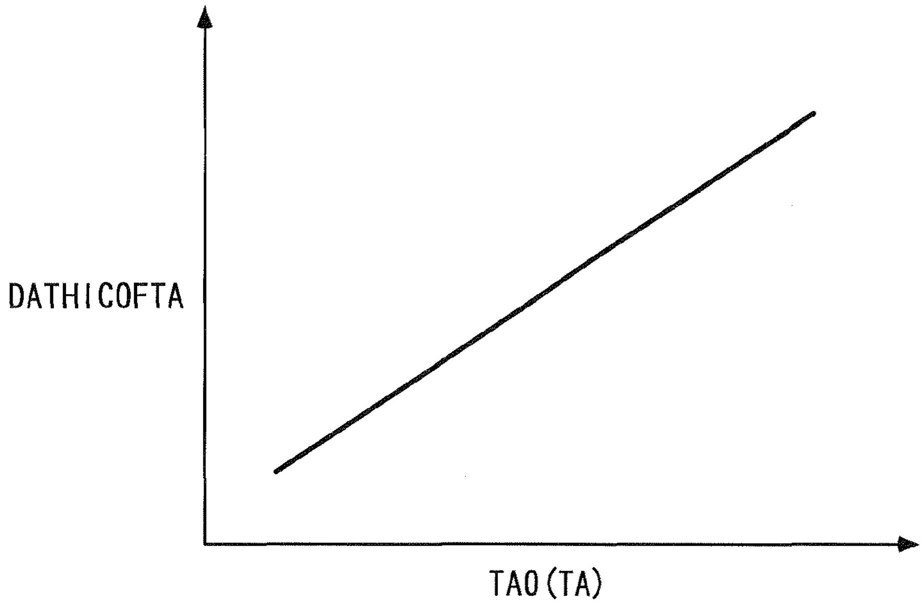
FIG. 23 A map for use in setting a learning TA correction term and a setting TA correction term according to the third embodiment.

Further, although in the first embodiment, the second predetermined opening degree ICMDOF2 is a fixed value, the second predetermined opening degree ICMDOF2 may be corrected and set using the atmospheric pressure PA and the intake air temperature TA. Specifically, first, a map shown in FIG. 22 is searched according to the atmospheric pressure PA to determine a map value DATHICOFPA, whereby the map value DATHICOFPA is set as a setting PA correction term dathicofpax, and a map shown in FIG. 23 is searched according to the intake air temperature TA to determine a map value DATHICOFTA, whereby the map value DATHICOFTA is set as a setting TA correction term dathicoftax. Then, the second predetermined opening degree ICMDOF2 is calculated using a basic value ICMDOF2B of the second predetermined opening degree and the setting PA correction term dathicofpax and the setting TA correction term dathicoftax, by the following equation (7):

$$ICMDOF2=ICMDOF2B+dathicofpax+dathicoftax \qquad (7)$$

In the map shown in FIG. 22, the map value DATHICOFPA is set to a larger value as the atmospheric pressure PA is lower, and in the map shown in FIG. 23, the map value DATHICOFTA is set to a larger value as the intake air temperature TA is higher.

Therefore, the second predetermined opening degree ICMDOF2 is corrected such that it becomes larger as the atmospheric pressure PA is lower and as the intake air temperature TA is higher. This makes it possible to set the second predetermined opening degree ICMDOF2 in a more fine-grained manner according to the actual atmospheric pressure PA and intake air temperature TA, and therefore it is possible to further enhance the accuracy of the stop control of the piston 3*d*.

Next, a process for calculating the first stage control target opening degree ICMDOFPRE according to a second embodiment of the present invention will be described with reference to FIG. 15. This calculation process is executed in place of the FIG. 13 calculation process according to the first embodiment. In the first embodiment, the first stage control start rotational speed NEICOFPRE is changed according to a change in the corrected target stop control start rotational speed NEICOFREFN. As distinct therefrom, in the present embodiment, the first stage control target opening degree ICMDOFPRE is changed without changing the first stage control start rotational speed NEICOFPRE.

In the present process, first, in a step 81, the difference between the predetermined first stage control start rotational speed NEICOFPRE and the corrected target stop control start rotational speed NEICOFREFN calculated in the step 28 in FIG. 5 is calculated as a rotational speed difference DNE12.

Figure 16:
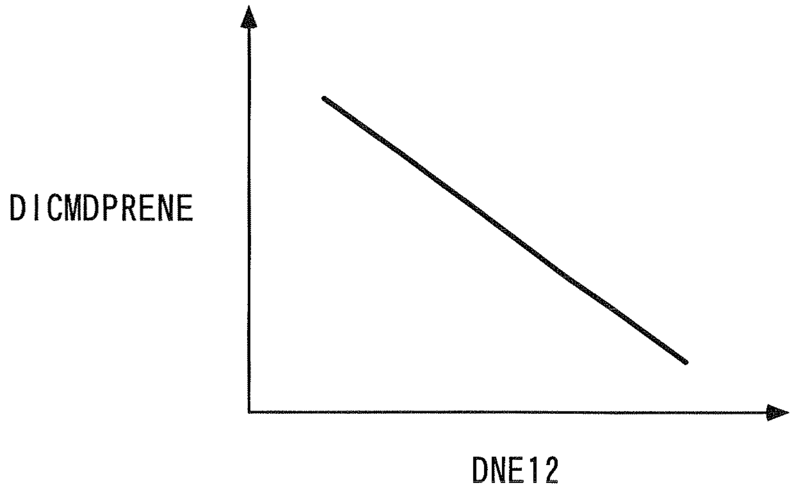
FIG. 16 A map for use in setting an NE correction term used in the FIG. 15 calculation process.

Next, an NE correction term DICMDPRENE is calculated by searching a map shown in FIG. 16 according to the calculated rotational speed difference DNE12 (step 82). In this map, the NE correction term DICMDPRENE is set to a larger value as the rotational speed difference DNE12 is smaller.

Figure 17:
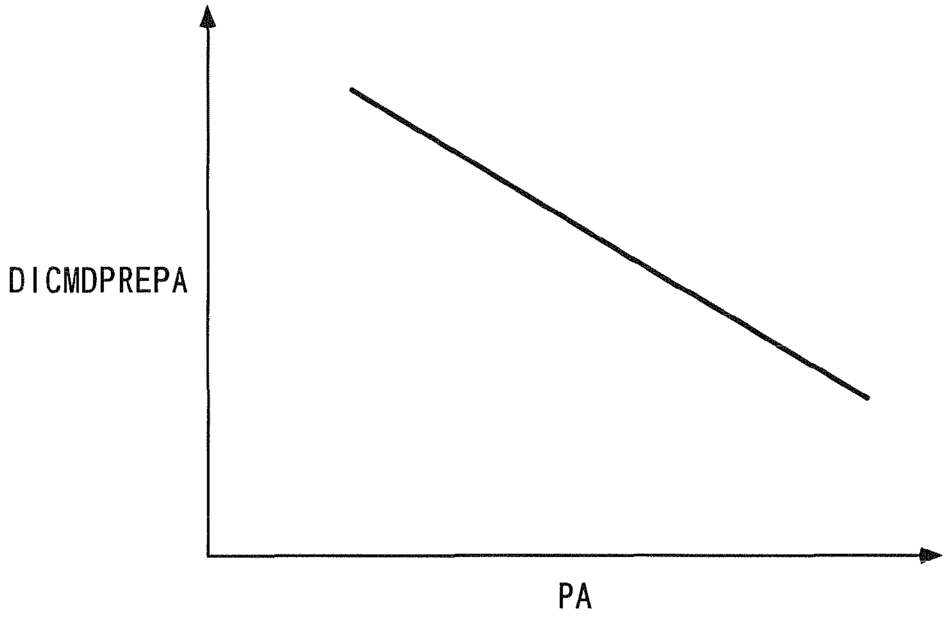
FIG. 17 A map for use in setting a PA correction term used in the FIG. 15 calculation process.

Next, a PA correction term DICMDPREPA is calculated by searching a map shown in FIG. 17 according to the atmospheric pressure PA (step 83). In this map, the PA correction term DICMDPREPA is set to a larger value as the atmospheric pressure PA is lower.

Figure 18:
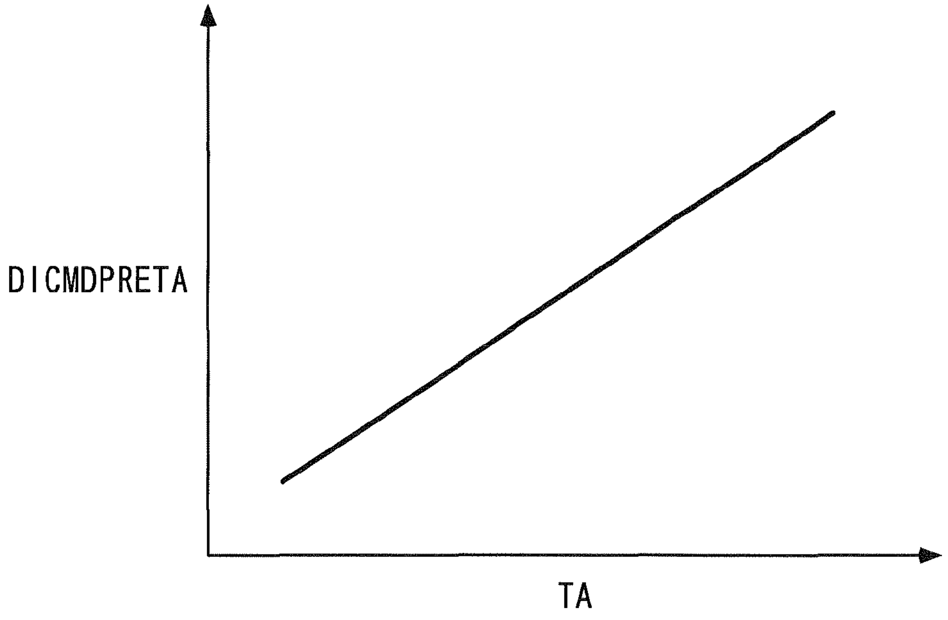
FIG. 18 A map for use in setting a TA correction term used in the FIG. 15 calculation process.

Next, a TA correction term DICMDPRETA is calculated by searching a map shown in FIG. 18 according to the intake air temperature TA (step 84). In this map, the TA correction term DICMDPRETA is set to a larger value as the intake air temperature TA is higher.

Finally, the first stage control target opening degree ICMDOFPRE is calculated by adding the NE correction term DICMDPRENE, the PA correction term DICMDPREPA, and the TA correction term DICMDPRETA, which are calculated in the steps 82 to 84, to a predetermined basic value ICMDPREB (step 85), by the following equation (8), followed by terminating the present process.

$$ICMDOFPRE=ICMDPREB+DICMDPRENE+DICMDPREPA+DICMDPRETA \quad (8)$$

Such correction is carried out for the following reasons: As the difference between the first stage control start rotational speed NEICOFPRE and the corrected target stop control start rotational speed NEICOFREFN (=rotational speed difference DNE12) is smaller, a time period taken for the first stage control becomes shorter, and hence the intake pressure PBA at the start of the second stage control becomes liable to be short. Therefore, as described above, by setting the NE correction term DICMDPRENE to a larger value and correcting the first stage control target opening degree ICMDOFPRE to a larger value, as the rotational speed difference DNE12 is smaller, the intake air amount and the intake pressure PBA are increased, whereby it is possible to hold the intake pressure PBA at the start of the second stage control substantially constant.

Further, as the atmospheric pressure PA is higher, the density of intake air is higher, so that in the case of the intake air amount being the same, the intake pressure PBA becomes more difficult to increase. Therefore, as described above, as the atmospheric pressure PA is higher, the PA correction term DICMDPREPA is set to a larger value to increase the intake air amount and the intake pressure PBA, whereby it is possible to hold the intake pressure PBA at the start of the second stage control substantially constant.

Further, as the intake air temperature TA is lower, the sliding friction of the piston 3*d* is larger and the density of intake air is higher, so that the rate of reduction of the engine speed NE becomes larger, and timing for starting the second stage control becomes earlier. This makes the time period for the first stage control shorter to make the intake pressure PBA at the start of the second stage control liable to be short. Therefore, as the intake air temperature TA is lower, the TA correction term DICMDPREPA is set to a larger value to increase the intake air amount and the intake pressure PBA, whereby it is possible to hold the intake pressure PBA at the start of the second stage control substantially constant.

Figure 19:
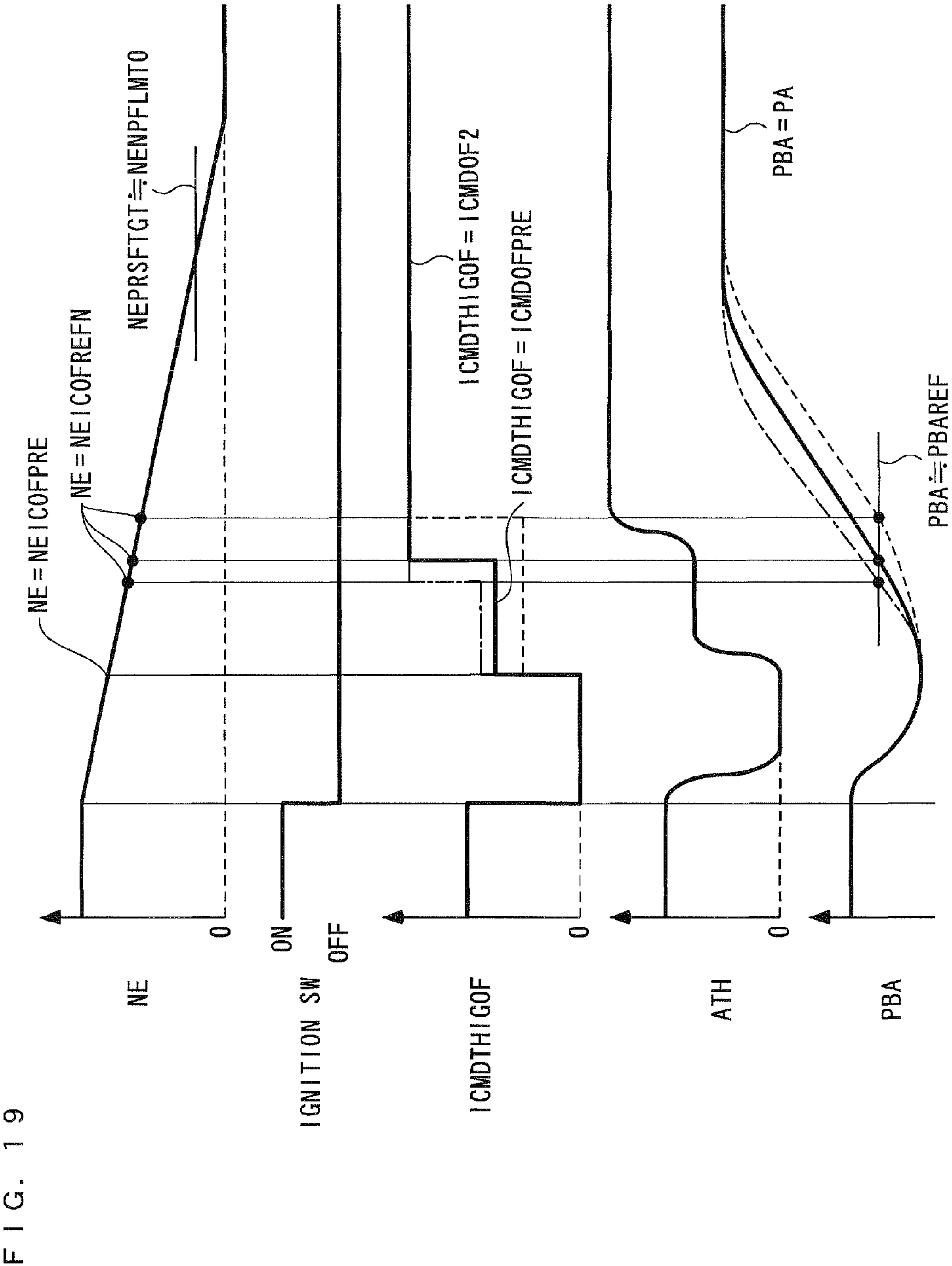
FIG. 19 A timing diagram showing an example of an operation obtained by a stop control process of the engine according to the second embodiment.

FIG. 19 shows an example of an operation obtained by a stop control process of the engine 3 according to the above-described second embodiment. In a case indicated by solid lines in the figure, when the ignition switch 21 is turned off, the target opening degree ICMDTHIGOF is set to 0, whereby the throttle valve opening ATH is controlled such that the throttle valve 13*a* is fully closed, and the intake pressure PBA is reduced. After that, when the engine speed NE becomes lower than the first stage control start rotational speed NEICOFPRE, the first stage control is started, and further when the engine speed NE becomes lower than the corrected target stop control start rotational speed NEICOFREFN, the second stage control is started. At this time, the intake pressure PBA has increased up to the desired initial value PBAREF.

Figure 15:
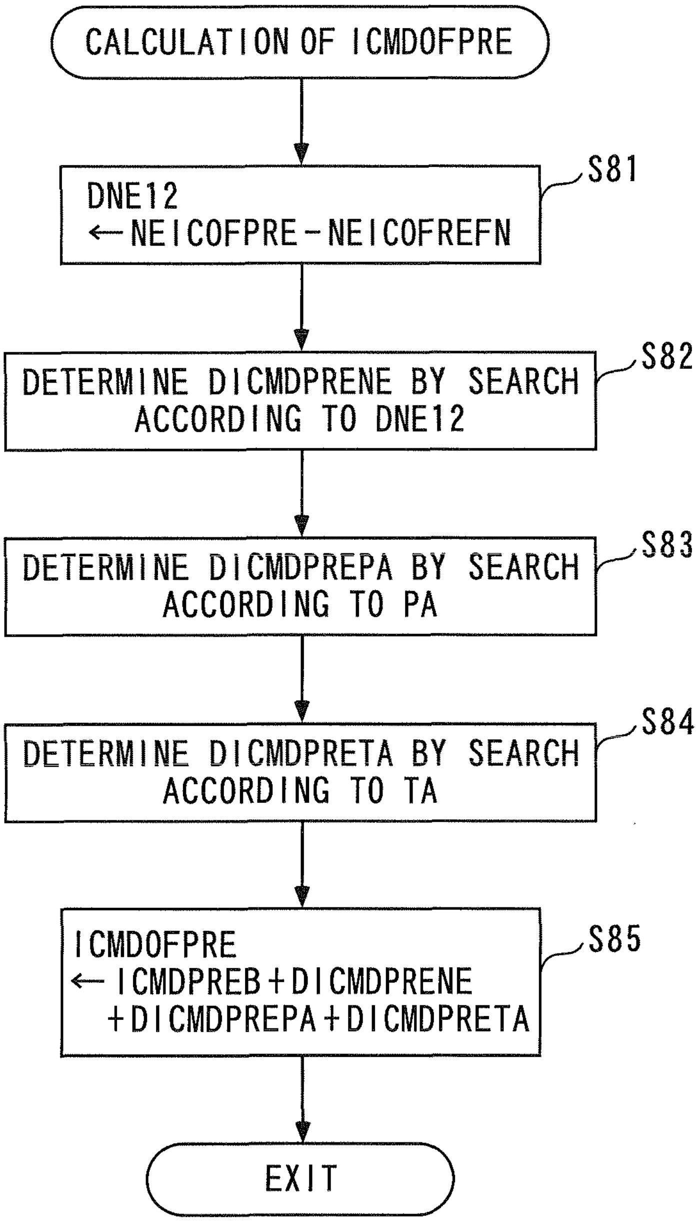
FIG. 15 A flowchart of a subroutine of the process executed in FIG. 5 for calculating the first stage control target opening degree, according to a second embodiment.

In contrast, in a case indicated by broken lines in the figure, the corrected target stop control start rotational speed NEICOFREFN is set to a smaller value than in the above-described case indicated by solid lines, and in accordance therewith, the first stage control target opening degree ICMDOFPRE is set to a smaller value (step 82 in FIG. 15). This causes the second control to be started in later timing than in the case indicated by solid lines, and accordingly makes the time period for the first stage control longer while reducing the intake air amount. As a consequence, the intake pressure PBA at the start of the second stage control is approximately equal to the initial value PBAREF.

Further, in a case indicated by one-dot chain lines in the figure, the corrected target stop control start rotational speed NEICOFREFN is set to a larger value than in the above-described case indicated by solid lines, and accordingly, the first stage control target opening degree ICMDOFPRE is set to a larger value (step 82 in FIG. 15). This causes the second control to be started in earlier timing than in the case indicated by solid lines, and accordingly, makes the time period for the first stage control shorter while reducing the intake air amount. As a consequence, the intake pressure PBA at the start of the second stage control is approximately equal to the initial value PBAREF.

As described hereinabove, according to the present embodiment, when the corrected target stop control start rotational speed NEICOFREFN is changed, the first stage control target opening degree ICMDOFPRE is set according to the rotational speed difference DNE12 between the predetermined first stage control start rotational speed NEICOFPRE and the changed corrected target stop control start rotational speed NEICOFREFN such that it is set to a larger value as the rotational speed difference DNE12 is smaller (FIG. 15 steps 81 and 82, FIG. 16). Therefore, even when the timing for starting the second stage control is changed, the first stage control is executed by the intake air amount coping with the change in the timing, whereby it is possible to stabilize the initial conditions for the second stage control, thereby making it possible to ensure the accuracy of the stop control of the piston 3*d* by the second stage control.

Further, since the first stage control target opening degree ICMDOFPRE is corrected according to the actual atmospheric pressure PA and intake air temperature TA (steps 83 to 85 in FIG. 15), it is possible to more properly set the first stage control target opening degree ICMDOFPRE, and therefore it is possible to further stabilize the initial conditions for the second stage control, thereby making it possible to further enhance the accuracy of the stop control of the piston 3*d*.

Next, a third embodiment of the present invention will be described with reference to FIGS. 20 to 26. In the first and second embodiments, the target stop control start rotational speed NEICOFREFX, which is a target value of the stop control start rotational speed for starting the second stage control, is set and learned. As distinct therefrom, in the present embodiment, a target second stage control opening degree ATHICOFREFX in the second stage control is set and learned.

Figure 20:
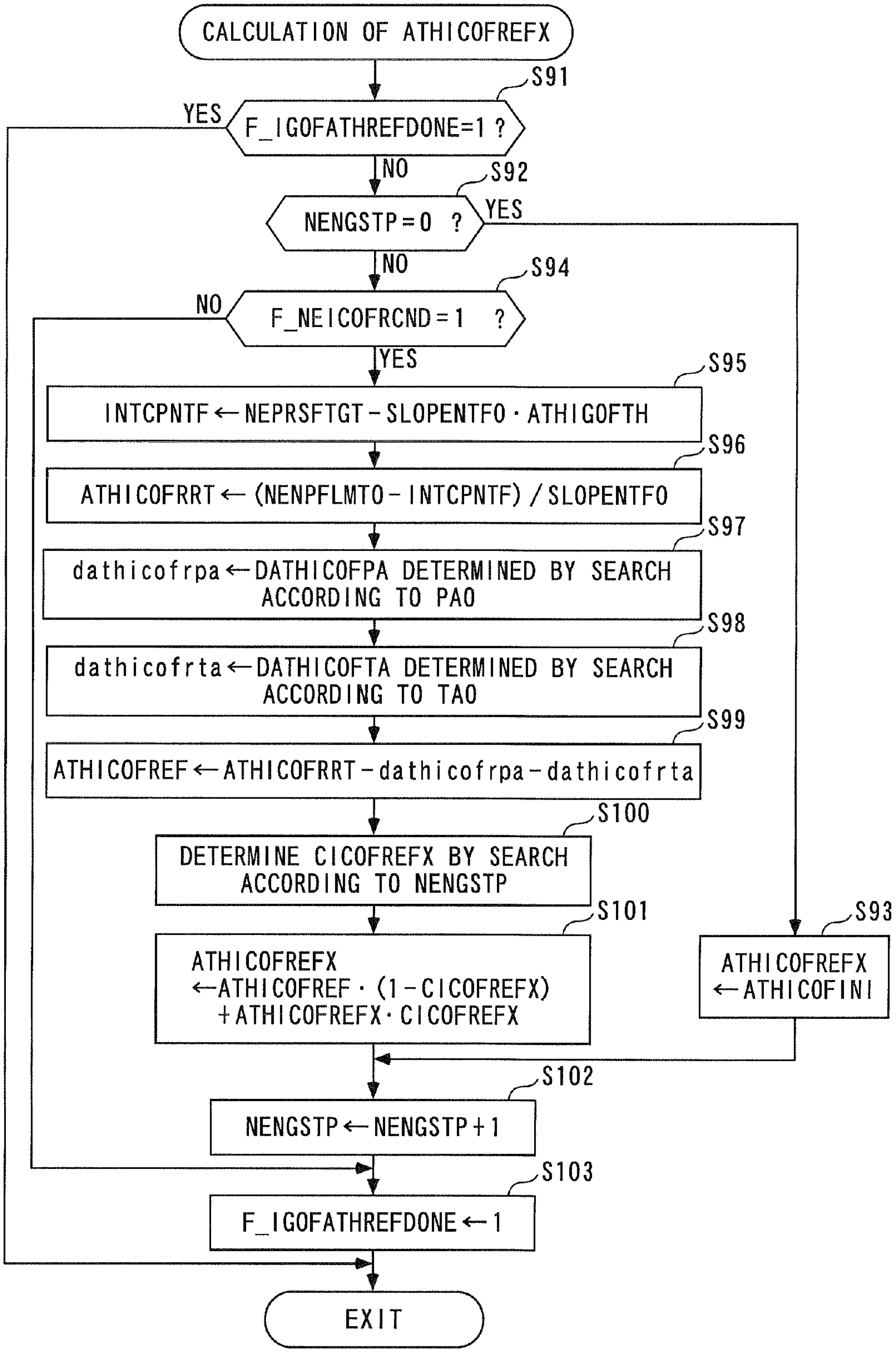
FIG. 20 A flowchart of a process for setting a target second stage control opening degree of the throttle valve according to a third embodiment.

FIG. 20 shows a process for setting this target second stage control opening degree ATHICOFREFX. In the present process, first, in a step 91, it is determined whether or not a target second stage control opening degree-setting completion flag F_IGOFATHREFDONE is equal to 1. If the answer to this question is affirmative (YES), i.e. if the target second stage control opening degree ATHICOFREFX has already been set, the present process is immediately terminated.

On the other hand, if the answer to the question of the step 91 is negative (NO), i.e. if the target second stage control opening degree ATHICOFREFX has not been set yet, it is determined in a step 92 whether or not the number of times of learning NENGSTP is equal to 0. If the answer to this question is affirmative (YES), the target second stage control opening degree ATHICOFREFX is set to a predetermined initial value ATHICOFINI (step 93), and then the process proceeds to a step 102, described hereinafter.

On the other hand, if the answer to the question of the step 92 is negative (NO), it is determined in a step 94 whether or not the aforementioned learning condition satisfied flag F_NEICOFRCND is equal to 1. If the answer to this question is negative (NO), i.e. if the learning conditions are not satisfied, the target second stage control opening degree NEICOFREFX is not learned, and then the process proceeds to a step 103, described hereinafter.

On the other hand, if the answer to the question of the step 94 is affirmative (YES), i.e. if the conditions for learning the target second stage control opening degree ATHICOFREFX are satisfied, the process proceeds to a step 95, wherein the intercept INTCPNPF is calculated using the final compression stroke rotational speed NEPRSFTGT obtained during the immediately preceding stop control, the second stage control opening degree ATHIGOFTH, and the predetermined slope SLOPENTF0, by the following equation (9):

$$INTCPNTF = NEPRSFTGT - SLOPENTF0 \cdot ATHIGOFTH \quad (9)$$

Figure 21:
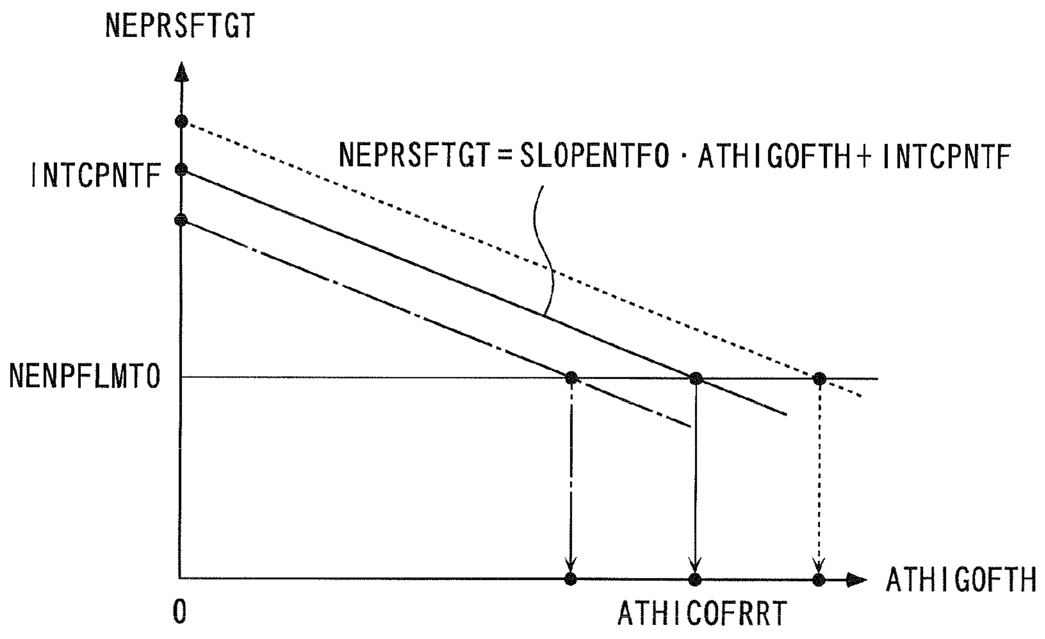
FIG. 21A view of a relationship between a second stage control opening degree and a final compression stroke rotational speed according to the third embodiment.

This equation (9) is based on preconditions that a correlation as shown in FIG. 21, i.e. a correlation expressed by a linear function having a slope of SLOPENTF0 and an intercept of INTCPNTF holds between the second stage control opening degree ATHIGOFTH and the final compression stroke rotational speed NEPRSFTGT, and the slope SLOPENTF0 is constant if the engine 3 is of the same type. The intercept INTCPNTF is calculated according to the above preconditions, using the second stage control opening degree ATHIGOFTH and the final compression stroke rotational speed NEPRSFTGT obtained during the stop control, by the equation (9), whereby the correlation between the second stage control opening degree ATHIGOFTH and the final compression stroke rotational speed NEPRSFTGT is determined. Incidentally, as the friction of the piston 3*d* is larger, the final compression stroke rotational NEPRSFTGT takes a larger value with respect to a basic value ATHICOFRRT of the same target second stage control opening degree, so that the linear function is offset toward an upper side (as indicated by broken lines in FIG. 21, for example), and the intercept INTCPNTF is calculated to be a larger value. Inversely, as the friction of the piston 3*d* is smaller, the linear function is offset toward a lower side (as indicated by one-dot chain lines in FIG. 21, for example) for the converse reason to the above, and the intercept INTCPNTF is calculated to be a smaller value.

Then, in a step 96, the basic value ATHICOFRRT of the target second stage control opening degree is calculated based on the correlation determined as described above, by using the calculated intercept INTCPNTF and slope SLOPENTF0 and applying the predetermined reference value NENPFLMT0 of the final compression stroke rotational speed to the following equation (10) (see FIG. 21).

$$ATHICOFRRT = (NENPFLMT0 - INTCPNTF) / SLOPENTF0 \quad (10)$$

By using the basic value ATHICOFRRT of the target second stage control opening degree calculated by the above-mentioned equation (10), it is possible to stop the piston 3*d* at the predetermined position.

Next, in a step 97, a map shown in FIG. 22 is searched according to the atmospheric pressure PA0 detected during the stop control to determine the map value DATHICOFPA, and the map value DATHICOFPA is set as the learning PA correction term dathicofrpa.

Then, in a step 98, a map shown in FIG. 23 is searched according to the intake air temperature TA0 detected during the stop control to determine a map value DATHICOFTA, and the map value DATHICOFTA is set as a learning TA correction term dathicofrta.

By the setting the maps in FIGS. 22 and 23, the above-described learning PA correction term dathicofrpa is set to a smaller value as the atmospheric pressure PA0 is higher, and the learning TA correction term dathicofrta is set to a smaller value as the intake air temperature TA0 is lower.

Next, a corrected basic value ATHICOFREF of the target second stage control opening degree is calculated using the basic value ATHICOFRRT of the target second stage control opening degree, the learning PA correction term dathicofrpa, and the learning TA correction term dathicofrta, which are calculated in the steps 96 to 98, by the following equation (11) (step 99):

$$ATHICOFREF = ATHICOFRRT - dathicofrpa - dathicofrta \quad (11)$$

As described hereinabove, since the learning PA correction term dathicofrpa is set to a smaller value as the atmospheric pressure PA0 is higher, the corrected basic value ATHICOFREF of the target second stage control opening degree is corrected to a larger value as the atmospheric pressure PA0 is higher. Further, since the learning TA correction term dathicofrta is set to a smaller value as the intake air temperature TA0 is lower, the corrected basic value ATHICOFREF of the target stop control start rotational speed is corrected to a larger value as the intake air temperature TA0 is lower.

Next, in a step 100, the averaging coefficient CICOFREFX is calculated by searching the map shown in FIG. 12 according to the number of times of learning NENGSTP.

Next, in a step 101, a current value ATHICOFREFX of the target second stage control opening degree is calculated using the calculated corrected basic value ATHICOFREF of the target stop control start rotational speed, an immediately preceding value ATHICOFREFX of the target second stage control opening degree, and the averaging coefficient CICOFREFX, by the following equation (12):

$$ATHICOFREFX=ATHICOFREF\cdot(1-CICOFREFX)+ATHICOFREFX\cdot CICOFREFX \quad (12)$$

As is clear from the above equation (12), the target second stage control opening degree ATHICOFREFX is calculated as a weighted average value of the corrected basic value ATHICOFRRT of the target second stage control opening degree and the immediately preceding value ATHICOFREFX of the target second stage control opening degree, and the averaging coefficient CICOFREFX is used as a weight coefficient for weighted averaging. Further, the averaging coefficient CICOFREFX is set as described above according to the number of times of learning NENGSTP, and therefore as the number of times of learning NENGSTP is smaller, the degree of reflection of the corrected basic value ATHICOFREF of the target second stage control opening degree becomes larger, whereas as the number of times of learning NENGSTP is larger, the degree of reflection of the immediately preceding value ATHICOFREFX of the target second stage control opening degree becomes larger.

In the step 102 following the step 93 or 101, the number of times of learning NENGSTP is incremented. Further, if the answer to the question of the step 94 is negative (NO), or after the step 102, the process proceeds to the step 103, wherein the target second stage control opening degree-setting completion flag F_IGOFATHREFDONE is set to 1, followed by terminating the present process.

Figure 24:
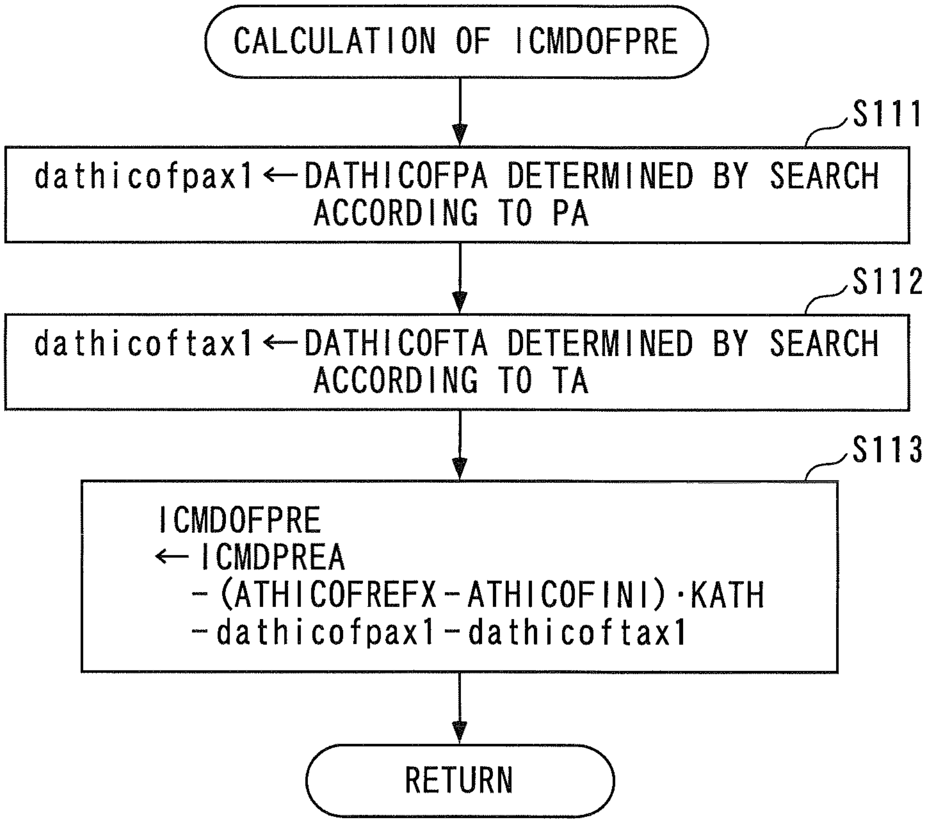
FIG. 24 A flowchart of a process for calculating a first stage control target opening degree according to the third embodiment.

FIG. 24 shows a process for calculating the first stage control target opening degree ICMDOFPRE. In the present process, first, in a step 111, the above-mentioned map shown in FIG. 22 is searched according to the atmospheric pressure PA currently detected to thereby determine the map value DATHICOFPA, and the map value DATHICOFPA is set as a setting PA correction term dathicofpax1.

Next, in a step 112, the above-mentioned map shown in FIG. 23 is searched according to the intake air temperature TA currently detected to thereby determine the map value DATHICOFTA, and the map value DATHICOFTA is set as a setting TA correction term dathicoftax1.

Then, in a step 113, the first stage control target opening degree ICMDOFPRE is calculated using a basic value ICMDPREA, the target second stage control opening degree ATHICOFREFX, the initial value ATHICOFINI, a predetermined value KATH, and the setting PA correction term dathicofpax1 and setting TA correction term dathicoftax1 calculated as described above, by the following equation (13), followed by terminating the present process.

$$ICMDOFPRE=ICMDPREA-(ATHICOFREFX-ATHICOFINI)\cdot KATH--dathicofpax1-dathicoftax1 \quad (13)$$

As is clear from the above equation (13), the first stage control target opening degree ICMDOFPRE is set to a smaller value as the target second stage control opening degree ATHICOFREFX is larger. The fact that the target second stage control opening degree ATHICOFREFX is set to a large value by the learning of the target second stage control opening degree ATHICOFREFX described above represents a state where a time period required for the first stage control is liable to be long since the friction of the piston 3*d* is small to make the piston 3*d* difficult to be stopped. Therefore, the first stage control target opening degree ICMDOFPRE is set to a smaller value as the target second stage control opening degree ATHICOFREFX is larger (see FIG. 28), whereby the intake air amount is reduced to suppress the rate of rise of the intake pressure PBA during the first stage control. This makes it possible to properly control the intake pressure PBA at the start of the second stage control, irrespective of the target second stage control opening degree ATHICOFREFX.

Further, as the atmospheric pressure PA is lower and as the intake air temperature TA is higher, the piston 3*d* becomes more difficult to be stopped. On the other hand, by setting the maps in FIGS. 22 and 23, in the equation (13), the setting PA correction term dathicofpax1 is set to a larger value as the atmospheric pressure PA is lower, and the setting TA correction term dathicoftax1 is set to a larger value as the intake air temperature TA is higher.

Therefore, the first stage control target opening degree ICMDOFPRE is corrected such that it becomes smaller as the atmospheric pressure PA is lower and as the intake air temperature TA is higher. This makes it possible to set the first stage control target opening degree ICMDOFPRE in a more fine-grained manner according to the actual atmospheric pressure PA and intake air temperature TA, to more properly control the intake pressure PBA at the start of the second stage control, and therefore it is possible to further enhance the accuracy of the stop control of the piston 3*d*.

Figure 25:
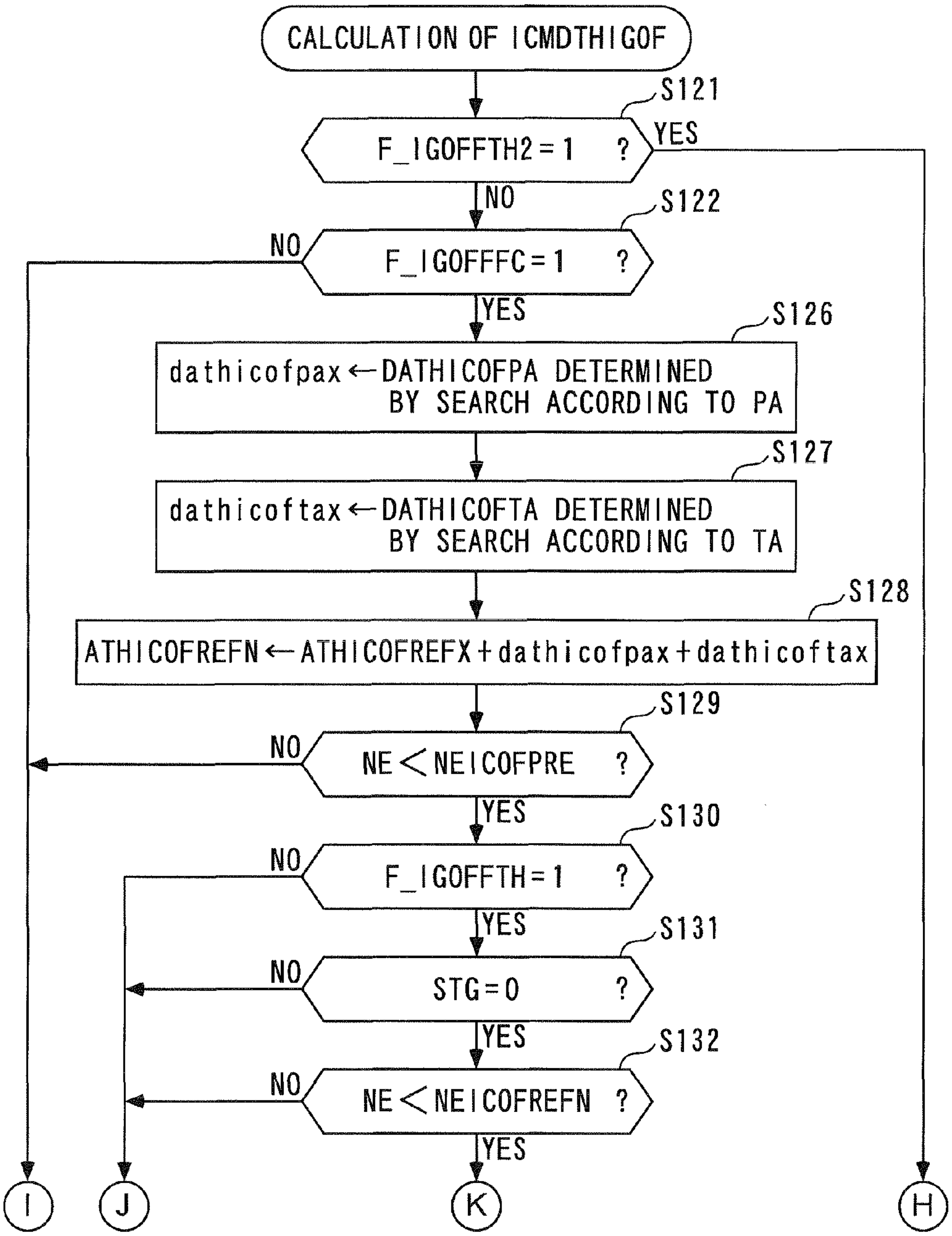
FIG. 25 A flowchart of a process for calculating a first stage control start rotational speed according to the third embodiment.
Figure 26:
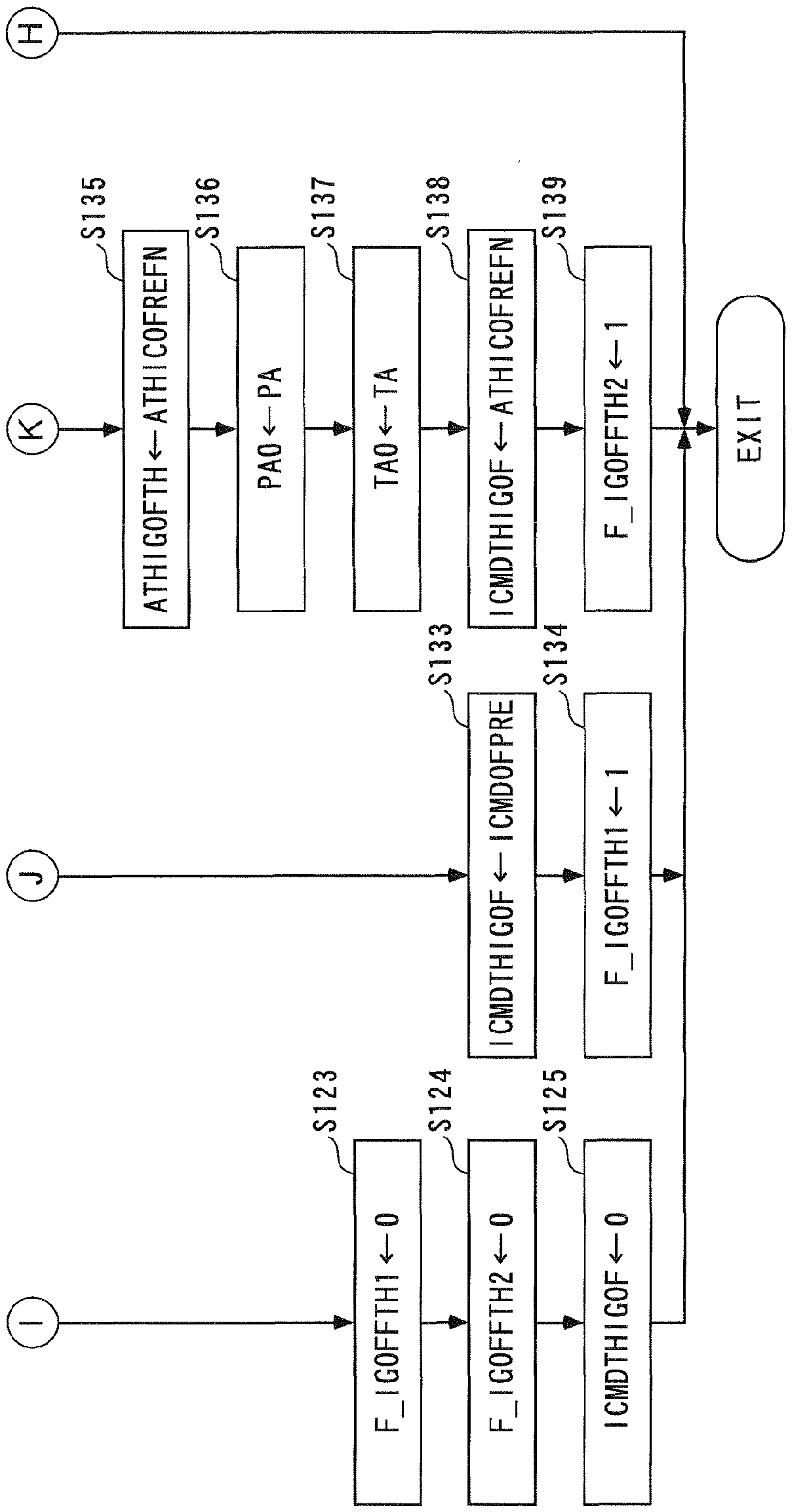
FIG. 26 A flowchart of a remaining part of the FIG. 25 setting calculating process.

FIGS. 25 and 26 show a process for setting the target opening degree ICMDTHIGOF of the throttle valve 13*a*. In the present process, first, in a step 121, it is determined whether or not the second stage control execution flag F_IGOFFTH2 is equal to 1. If the answer to this question is affirmative (YES), i.e. if the second stage control is being executed, the present process is immediately terminated.

On the other hand, if the answer to the question of the step 121 is negative (NO), in a step 122, it is determined whether or not the fuel cut flag F_IGOFFFC is equal to 1. If the answer to this question is negative (NO), the first stage control execution flag F_IGOFFTH1 and the second stage control execution flag F_IGOFFTH2 are set to 0, respectively (steps 123 and 124), and the target opening degree ICMDTHIGOF is set to 0 (step 125), followed by terminating the present process.

On the other hand, if the answer to the question of the step 122 is affirmative (YES), the above-mentioned map shown in FIG. 22 is searched according to the atmospheric pressure PA currently detected to determine the map value DATHICOFPA, whereby the map value DATHICOFPA is set as a setting PA correction term dathicofpax (step 126).

Next, in a step 127, the above-mentioned map shown in FIG. 23 is searched according to the intake air temperature TA currently detected to thereby determine the map value DATHICOFTA, and the map value DATHICOFTA is set as a setting TA correction term dathicoftax.

Next, in a step 128, a corrected target second stage control opening degree ATHICOFREFN is calculated using the target second stage control opening degree ATHICOFREFX calculated in the step 101 in FIG. 20, the calculated setting PA correction term dathicofpax and setting TA correction term dathicoftax, by the following equation (14):

$$ATHICOFREFN-ATHICOFREFX+dathicofpax+dathicoftax \quad (14)$$

As the atmospheric pressure PA is lower, the density of intake air is lower and the resistance of intake air to the piston 3_d_ is smaller, so that the rate of reduction of the engine speed NE becomes smaller. Further, after the control signal based on the target opening degree ICMDTHIGOF is delivered, there occurs a delay before the opening degree of the throttle valve 13_a_ becomes commensurate with the control signal, and a further delay occurs before the intake air amount becomes large enough to be commensurate with the opening degree of the throttle valve 13_a_. Therefore, by correcting the corrected target second stage control opening degree ATHICOFREFN to a larger value as the atmospheric pressure PA is lower, to thereby increase the intake air amount, it is possible to properly avoid the adverse influence of the operation of the throttle valve 13_a_ and the delay of intake air, described above.

On the other hand, since the setting TA correction term dathicoftax is set to a larger value as the intake air temperature TA is higher, the corrected target second stage control opening degree ATHICOFREFN is corrected to a larger value as the intake air temperature TA is higher. As the intake air temperature TA is higher, the sliding friction of the piston 3_d_ is smaller, and the density of intake air is lower, which reduces the rate of reduction of the engine speed NE. Therefore, by correcting the corrected target second stage control opening degree ATHICOFREFN to a smaller value as the intake air temperature TA is lower to thereby reduce the intake air amount, it is possible to properly avoid the adverse influence of the operation of the throttle valve 13_a_ and the delay of intake air.

Then, in a step 129, it is determined whether or not the engine speed NE is smaller than a predetermined first stage control start rotational speed NEICOFPRE (e.g. 550 rpm). If the answer to this question is negative (NO), i.e. if NE≥NEICOFPRE holds, the above-described steps 123 to 125 are executed, followed by terminating the present process.

On the other hand, if the answer to the question of the step 129 is affirmative (YES), i.e. if the engine speed NE is smaller than the first stage control start rotational speed NEICOFPRE, it is determined whether or not the first stage control execution flag F_IGOFFTH1 is equal to 1 (step 130). If the answer to this question is negative (NO), i.e. if the first stage control has not been executed yet, the target opening degree ICMDTHIGOF is set to the first stage control target opening degree ICMDOFPRE calculated in the step 113 in FIG. 24 (step 133), and the first stage control execution flag F_IGOFFTH1 is set to 1 (step 134), followed by terminating the present process.

On the other hand, if the answer to the question of the step 130 is affirmative (YES), i.e. if the first stage control is being executed, it is determined whether or not the stage number STG is 0 (step 131). If the answer to this question is negative (NO), the above-described steps 133 and 134 are executed, followed by terminating the present process.

On the other hand, if the answer to the question of the step 131 is affirmative (YES), i.e. if the stage number STG is 0, it is determined whether or not the engine speed NE is smaller than a predetermined stop control start rotational speed NEICOFREFN (e.g. 500 rpm) (step 132). If the answer to this question is negative (NO), i.e. if NEICOFREFN≤NE<NEICOFPRE holds, the above-described steps 133 and 134 are executed to thereby continue the first stage control, followed by terminating the present process.

On the other hand, if the answer to the question of the step 132 is affirmative (YES), i.e. if the stage number STG is 0, and at the same time if the engine speed NE is lower than the stop control start rotational speed NEICOFREFN, the process proceeds to a step 135, wherein the corrected target second stage control opening degree ATHICOFREFN calculated in the step 128 is stored as a second stage control opening degree ATHIGOFTH for the stop control, and the atmospheric pressure PA and the intake air temperature TA, which are currently detected, are stored as an atmospheric pressure PA0 and an intake air temperature TA0 detected for the stop control (steps 136 and 137), respectively. The stored second stage control opening degree ATHIGOFTH is applied to the aforementioned equation (9), and the atmospheric pressure PA0 and the intake air temperature TA0 are used in the FIG. 20 steps 97 and 98, for calculating the learning PA correction term dathicofrpa and the learning TA correction term dathicofrta, respectively.

Next, in a step 138, the target opening degree ICMDTHIGOF is set to the corrected target second stage control opening degree ATHICOFREFN set in the step 128. Further, the second stage control execution flag F_IGOFFTH2 is set to 1 (step 139), followed by terminating the present process.

After that, the final compression stroke rotational speed NEPRSFTGT is calculated in the process shown in FIGS. 7 and 8. In the following stop control, the calculated final compression stroke rotational speed NEPRSFTGT is applied to the aforementioned equation (9), and is used for setting the target second stage control opening degree ATHICOFREFX.

Figure 28:
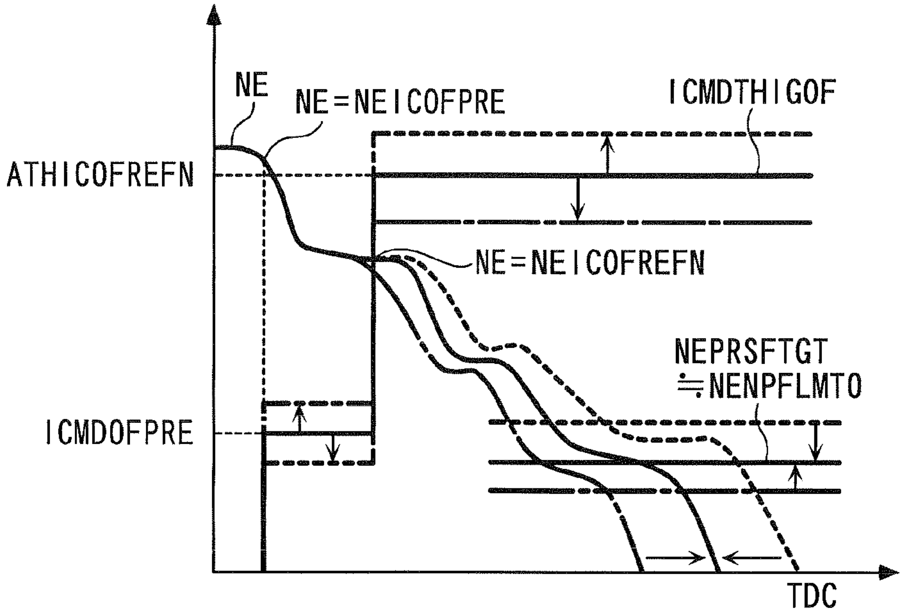
FIG. 28 A view of an example of an operation obtained by a stop control process of the engine according to the third embodiment.

As described hereinabove, according to the present embodiment, when the target second stage control opening degree ATHICOFREFX is changed, the first stage control target opening degree ICMDOFPRE is set to a smaller value as the target second stage control opening degree ATHICOFREFX is larger (see FIG. 28). Therefore, even when the target second stage control opening degree ATHICOFREFX is changed, the first stage control is executed by the intake air amount dependent on the change in the target second stage control opening degree ATHICOFREFX, whereby it is possible to stabilize the intake pressure PBA at the start of the second stage control, thereby making it possible to ensure the accuracy of the stop control of the piston 3_d_ by the second stage control.

Further, since the first stage control target opening degree ICMDOFPRE is corrected according to the actual atmospheric pressure PA and intake air temperature TA, it is possible to more properly set the first stage control target opening degree ICMDOFPRE, and therefore it is possible to further stabilize the intake pressure PBA at the start of the second stage control, thereby making it possible to further enhance the accuracy of the stop control of the piston 3_d_.

Note that in the above-described third embodiment, the first stage control start rotational speed NEICOFPRE is a fixed value, the first stage control start rotational speed NEICOFPRE may be corrected and set using the atmospheric pressure PA and the intake air temperature TA. Specifically, first, a map shown in FIG. 10 is searched according to the atmospheric pressure PA to determine a map value DNEICOFPA, whereby the map value DNEICOFPA is set as the setting PA correction term dneicofpax, and a map shown in FIG. 11 is searched according to the intake air temperature TA to determine a map value DNEICOFTA, whereby the map value DNEICOFTA is set as the setting TA correction term dneicoftax. Then, the second predetermined opening degree ICMDOF2 is calculated using a basic value NEICOFPREB of the first stage control start rotational speed and the setting PA correction term dneicofpax and the setting TA correction term dneicoftax, by the following equation (15):

$$NEICOFPRE=NEICOFPREB+dneicofpax+dneicoftax \quad (15)$$

In the map shown in FIG. 10, the map value DNEICOFPA is set to a larger value as the atmospheric pressure PA is higher, and in the map shown in FIG. 11, the map value DNEICOFTA is set to a larger value as the intake air temperature TA is lower.

Therefore, the first stage control start rotational speed NEICOFPRE is corrected such that it becomes larger as the atmospheric pressure PA is higher and as the intake air temperature TA is lower. This makes it possible to set the first stage control start rotational speed NEICOFPRE in a more fine-grained manner according to the actual atmospheric pressure PA and intake air temperature TA, and therefore it is possible to further enhance the accuracy of the stop control of the piston 3*d*.

Figure 27:
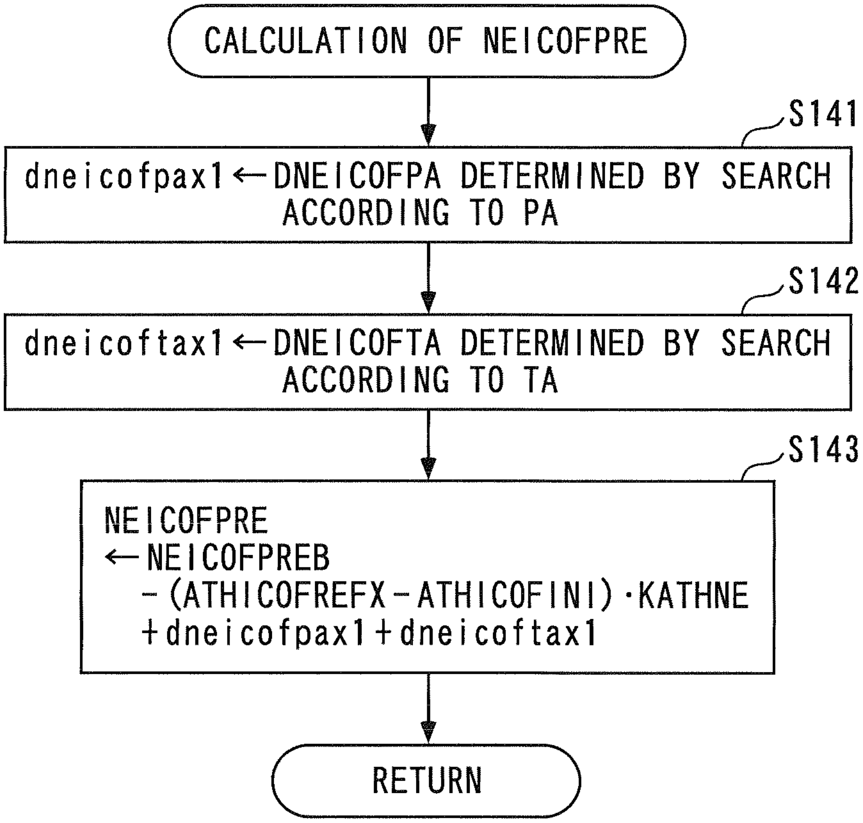
FIG. 27 A flowchart of a process for calculating a first stage control start rotational speed according to a variation of the third embodiment.

Next, a variation of the third embodiment will be described with reference to FIG. 27. In the third embodiment, the first stage control start rotational speed NEICOFPRE used in the step 129 in FIG. 25 is a fixed value. As distinct therefrom, in this variation, the first stage control start rotational speed NEICOFPRE is calculated according to the target second stage control opening degree ATHICOFREFX.

In the present embodiment, first, in a step 141, the above-mentioned map shown in FIG. 10 is searched according to the atmospheric pressure PA to thereby determine the map value DNEICOFPA, and the map value DNEICOFPA is set as a setting PA correction term dneicofpax1 for the first stage control start rotational speed.

Next, in a step 142, the above-mentioned map shown in FIG. 11 is searched according to the intake air temperature TA to determine the map value DNEICOFTA, whereby the map value DNEICOFTA is set as a setting TA correction term dneicoftax1 for the first stage control start rotational speed.

Next, in a step 143, the first stage control start rotational speed NEICOFPRE is calculated using a predetermined basic value NEICPREB, the target second stage control opening degree ATHICOFREFX, the initial value ATHICOFINI, and a predetermined coefficient KATHNE, as well as the setting PA correction term dneicofpax1 and setting TA correction term dneicoftax1 calculated as described above, by the following equation (16):

$$\mathrm{NEICOFPRE}=\mathrm{NEICPREB}-(\mathrm{ATHICOFREFX}-\mathrm{ATHICOFINI})\cdot \mathrm{KATHNE}+\mathrm{dneicofpax1}+\mathrm{dneicoftax1} \quad (16)$$

followed by terminating the present process.

Figure 29:
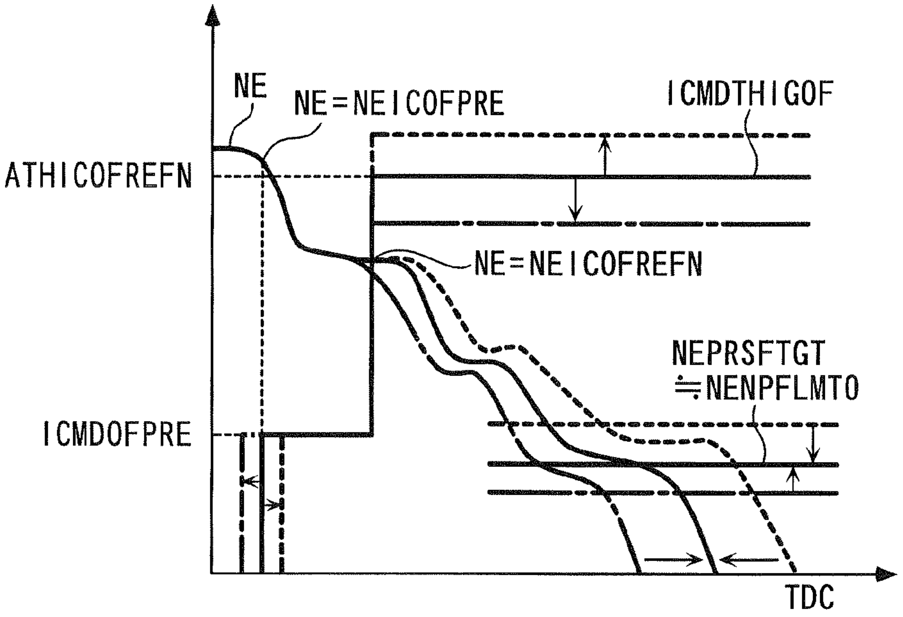
FIG. 29 A view of an example of an operation obtained by a stop control process of the engine according to the variation of the third embodiment.

As is clear from the above equation (16), the first stage control start rotational speed NEICOFPRE is set to a smaller value as the target second stage control opening degree ATHICOFREFX is larger. The fact that the target second stage control opening degree ATHICOFREFX is set to a large value by the learning of the target second stage control opening degree ATHICOFREFX described above represents a state where the time period required for the first stage control is liable to be long since the friction of the piston 3*d* is small to make the piston 3*d* difficult to be stopped. Therefore, the first stage control start rotational speed NEICOFPRE is set to a smaller value as the target second stage control opening degree ATHICOFREFX is larger (see FIG. 29), whereby the first stage control is started in later timing. As a consequence, it is possible to properly control the intake pressure PBA at the start of the second stage control irrespective of the target second stage control opening degree ATHICOFREFX.

Further, as the atmospheric pressure PA is lower and as the intake air temperature TA is higher, the piston 3*d* becomes more difficult to be stopped. On the other hand, by setting the maps in FIGS. 10 and 11, in the equation (16), the setting PA correction term dneicofpax1 is set to a smaller value as the atmospheric pressure PA is lower and the setting TA correction term dneicoftax1 is set to a smaller value as the intake air temperature TA is higher.

Therefore, the first stage control start rotational speed NEICOFPRE is corrected such that it becomes smaller as the atmospheric pressure PA is lower and as the intake air temperature TA is higher. This makes it possible to set the first stage control start rotational speed NEICOFPRE in a more fine-grained manner according to the actual atmospheric pressure PA and intake air temperature TA, to thereby more properly control the intake pressure PBA at the start of the second stage control. Therefore, it is possible to further enhance the accuracy of the stop control of the piston 3*d*.

Note that the present invention is by no means limited to the embodiments described above, but can be practiced in various forms. For example, although in the above-described embodiments, the throttle valve 13*a* is used as the intake air amount-adjusting valve for adjusting the intake air amount during stoppage of the engine 3, in place of the throttle valve 13*a*, there may be used intake valves the lift of which can be changed by a variable intake lift mechanism.

Further, although in the above-described embodiments, the correction of the target stop control start rotational speed NEICOFREFX or the first stage control target opening degree ICMDOFPRE is performed according to the atmospheric pressure PA and the intake air temperature TA, the correction may be performed according to a parameter indicative of the temperature of the engine 3, such as the engine coolant temperature TW, in addition to or in place of the atmospheric pressure PA and the intake air temperature TA. In this case, as the engine coolant temperature TW is lower, the sliding friction of the piston 3*d* is larger, and hence the target stop control start rotational speed NEICOFREFX or the first stage control target opening degree ICMDOFPRE is corrected to a larger value. Further, such correction may be carried out on the first stage control start rotational speed NEICOFPRE and/or the second predetermined opening degree ICMDOF2 for use in the second stage control.

Further, in the above-described embodiments, when the ignition switch 21 is turned off, judging that a command for stopping the engine 3 is issued, the stop control is executed, but in a case where an idle stop is executed in which the engine 3 is automatically stopped when predetermined stop conditions are satisfied, the stop control may be executed after satisfaction of the stop conditions.

Furthermore, although in the above-described embodiment, the present invention is applied to the gasoline engine installed on a vehicle, this is not limitative, but it can be applied to various engines other than the gasoline engine, e.g. a diesel engine, and further, it can be applied to engines other than the engines for a vehicle, e.g. engines for ship propulsion machines, such as an outboard motor having a vertically-disposed crankshaft. Further, it is possible to change details of the construction of the embodiment within the spirit and scope of the present invention.

INDUSTRIAL APPLICABILITY

As described heretofore, the stop control system according to the present invention is useful in accurately stopping the piston at a predetermined position while preventing occurrence of untoward noise and vibration during stoppage of the engine.

REFERENCE SIGNS LIST

1 stop control system for internal combustion engine

2 ECU (rotational speed-detecting means, first intake air amount control means, second intake air amount control means, second predetermined rotational speed-setting means, first predetermined rotational speed-setting means, second predetermined opening degree-setting means, first predetermined rotational speed-limiting means, first predetermined opening degree-correcting means, first predetermined opening degree-setting means, first correction means, second correction means)

3 engine (internal combustion engine)

3*d* piston

13*a* throttle valve (intake air amount-adjusting valve)

22 intake air temperature sensor (detection means)

23 atmospheric pressure sensor (detection means)

24 crank angle sensor (rotational speed-detecting means)

26 engine coolant temperature sensor (detection means)

NE engine speed (rotational speed of internal combustion engine)

PA atmospheric pressure

TA intake air temperature (temperature of intake air)

TW engine coolant temperature (temperature of internal combustion engine)

NEICOFPRE first stage control start rotational speed (first predetermined rotational speed)

NEICOFREFN corrected target stop control start rotational speed (second predetermined rotational speed)

ICMDOFPRE first stage control target opening degree (first predetermined opening degree)

ICMDOF2 second predetermined opening degree

NEPRELMT upper limit value

The invention claimed is:

1. A stop control system for an internal combustion engine, which controls a stop position of a piston of the engine to a predetermined position during stoppage of the engine by controlling an intake air amount, comprising:

an intake air amount-adjusting valve for adjusting the intake air amount;

rotational speed-detecting means for detecting a rotational speed of the engine;

first intake air amount control means for closing said intake air amount-adjusting valve when a command for stopping the engine is issued, and thereafter executing first intake air amount control in which said intake air amount-adjusting valve is controlled to a first predetermined opening degree larger than an opening degree of said intake air amount-adjusting valve when said intake air amount-adjusting valve is closed, when the detected rotational speed of the engine becomes equal to a first predetermined rotational speed;

second intake air amount control means for executing second intake air amount control in which said intake air amount-adjusting valve is controlled to a second predetermined opening degree larger than the first predetermined opening degree in order to stop the piston at the predetermined position, when the rotational speed of the engine becomes equal to a second predetermined rotational speed lower than the first predetermined rotational speed after the first intake air amount control;

second predetermined rotational speed-setting means for setting the second predetermined rotational speed according to a magnitude of friction of the piston; and first predetermined rotational speed-setting means for setting the first predetermined rotational speed such that the first predetermined rotational speed is higher as the set second predetermined rotational speed is higher.

2. The stop control system as claimed in claim 1, further comprising:

first predetermined rotational speed-limiting means for limiting the first predetermined rotational speed to a predetermined upper limit value when the set first predetermined rotational speed is higher than the upper limit value; and first predetermined opening degree-correcting means for correcting the first predetermined opening degree such that the first predetermined opening degree is increased and at the same time is corrected to a smaller value than the second predetermined opening degree, when the first predetermined rotational speed is limited.

3. The stop control system as claimed in claim 1, further comprising:

detection means for detecting at least one of a temperature of intake air drawn into the engine, an atmospheric pressure, and a temperature of the engine; and first correction means for correcting at least one of the first predetermined rotational speed and the first predetermined opening degree according to at least one of the temperature of intake air, the atmospheric pressure, and the temperature of the engine, which are detected.

4. The stop control system as claimed in claim 1, further comprising:

detection means for detecting at least one of a temperature of intake air drawn into the engine, an atmospheric pressure, and a temperature of the engine; and second correction means for correcting at least one of the second predetermined rotational speed and the second predetermined opening degree according to at least one of the temperature of intake air, the atmospheric pressure, and the temperature of the engine, which are detected.

5. A stop control method for an internal combustion engine, which controls a stop position of a piston of the engine to a predetermined position during stoppage of the engine by controlling an intake air amount, comprising:

a step of detecting a rotational speed of the engine;

a step of closing an intake air amount-adjusting valve for adjusting the intake air amount when a command for stopping the engine is issued, and thereafter executing first intake air amount control in which the intake air amount-adjusting valve is controlled to a first predetermined opening degree larger than an opening degree of said intake air amount-adjusting valve when said intake air amount-adjusting valve is closed, when the detected rotational speed of the engine becomes equal to a first predetermined rotational speed;

a step of executing second intake air amount control in which the intake air amount-adjusting valve is controlled to a second predetermined opening degree larger than the first predetermined opening degree in order to stop the piston at the predetermined position, when the rotational speed of the engine becomes equal to a second predetermined rotational speed lower than the first predetermined rotational speed after the first intake air amount control;

a step of setting the second predetermined rotational speed according to a magnitude of friction of the piston; and a step of setting the first predetermined rotational speed such that the first predetermined rotational speed is higher as the set second predetermined rotational speed is higher.

6. The stop control method as claimed in claim 5, further comprising:

a step of limiting the first predetermined rotational speed to a predetermined upper limit value when the set first predetermined rotational speed is higher than the upper limit value; and a step of correcting the first predetermined opening degree such that the first predetermined opening degree is increased and at the same time is corrected to a smaller value than the second predetermined opening degree, when the first predetermined rotational speed is limited.

7. The stop control method as claimed in claim 5, further comprising:

a step of detecting at least one of a temperature of intake air drawn into the engine, an atmospheric pressure, and a temperature of the engine; and a step of correcting at least one of the first predetermined rotational speed and the first predetermined opening degree according to at least one of the temperature of intake air, the atmospheric pressure, and the temperature of the engine, which are detected.

8. The stop control method as claimed in claim 5, further comprising:

a step of detecting at least one of a temperature of intake air drawn into the engine, an atmospheric pressure, and a temperature of the engine; and a step of correcting at least one of the second predetermined rotational speed and the second predetermined opening degree according to at least one of the temperature of intake air, the atmospheric pressure, and the temperature of the engine, which are detected.

* * * * *